US011176503B2

(12) United States Patent
Kobayashi et al.

(10) Patent No.: US 11,176,503 B2
(45) Date of Patent: Nov. 16, 2021

(54) MANAGING VEHICLES USING MOBILITY AGENT

(71) Applicant: Toyota Jidosha Kabushiki Kaisha, Toyota (JP)

(72) Inventors: Hiromitsu Kobayashi, Sunnyvale, CA (US); Akihito Nakamura, Sunnyvale, CA (US); BaekGyu Kim, Cupertino, CA (US); Roger Melen, Los Altos Hills (CA)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 16/296,216

(22) Filed: Mar. 8, 2019

(65) Prior Publication Data

US 2020/0286020 A1    Sep. 10, 2020

(51) Int. Cl.
G06Q 10/06 (2012.01)
G01C 21/34 (2006.01)
G06Q 50/30 (2012.01)

(52) U.S. Cl.
CPC ... *G06Q 10/06312* (2013.01); *G01C 21/3438* (2013.01); *G01C 21/3453* (2013.01); *G06Q 50/30* (2013.01)

(58) Field of Classification Search
USPC ....................................................... 705/7.22
See application file for complete search history.

(56) References Cited

U.S. PATENT DOCUMENTS

2004/0078141 A1* 4/2004 Kittell .................... B60L 50/71
701/468
2010/0280752 A1* 11/2010 Huang ................... G06Q 40/00
701/517
2013/0268406 A1* 10/2013 Radhakrishnan .. G06Q 30/0283
705/26.61

(Continued)

OTHER PUBLICATIONS

Kashevnik et al. (A. Kashevnik, N. Teslya, S. Mikhailov, M. Petrov, A. Shabaevand A. Krasov, "Ridesharing for Carsharing Service Provider: Driverand Pedestrian Route Matching," 2019 25th Conference of Open Innovations Association (FRUCT), Helsinki, Finland, Nov. 5-8, 2019, pp. 146-152, doi: 10.23919/FRUCT481.*

*Primary Examiner* — Matthew D Henry
(74) *Attorney, Agent, or Firm* — VLP Law Group LLP; Michel Bohn

(57) ABSTRACT

An example method may receive, from a requesting mobility provider (MP), request parameter(s) of a transportation request and vehicle movement requirement(s) of the requesting MP; select, from vehicle profiles of other MPs, first vehicle profile(s) of first MP(s) based on the request parameter(s) of the transportation request, the first vehicle profile(s) including a first vehicle profile representing a first vehicle of a first MP; receive, from the first MP, a mobility plan for the first vehicle to execute the transportation request, the mobility plan of the first vehicle being generated based on the request parameter(s) of the transportation request and an operational protocol of the first MP; determine that the first vehicle is qualified to execute the transportation request using the vehicle movement requirement(s) of the requesting MP and the mobility plan of the first vehicle; and provide the mobility plan of the first vehicle to the requesting MP.

30 Claims, 8 Drawing Sheets

(56) References Cited

U.S. PATENT DOCUMENTS

2016/0232719 A1* 8/2016 Brinig .................... G07B 15/02
2016/0364823 A1* 12/2016 Cao ........................ G06Q 50/30
2018/0293687 A1* 10/2018 Hardee ................... H04W 4/44

\* cited by examiner

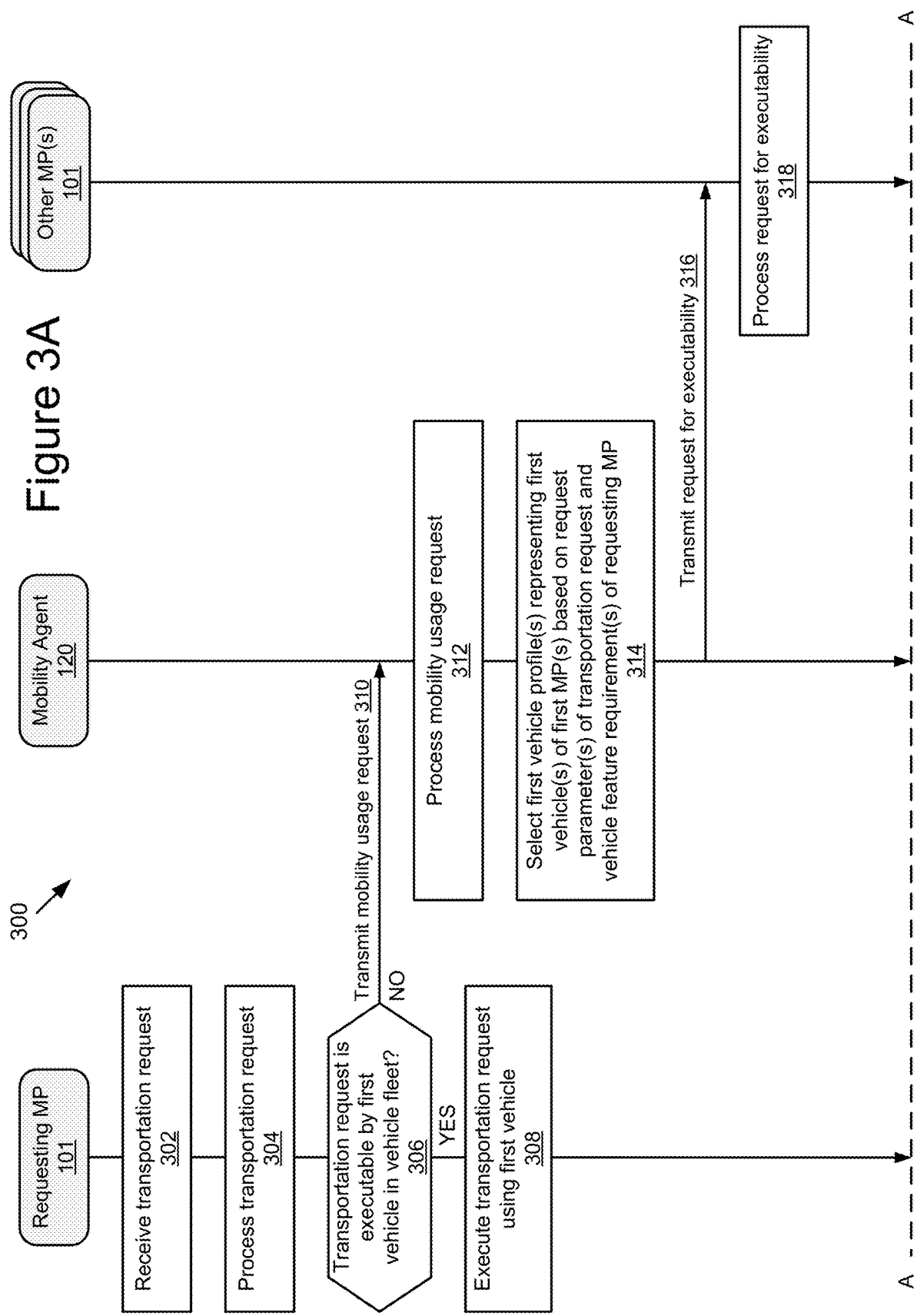

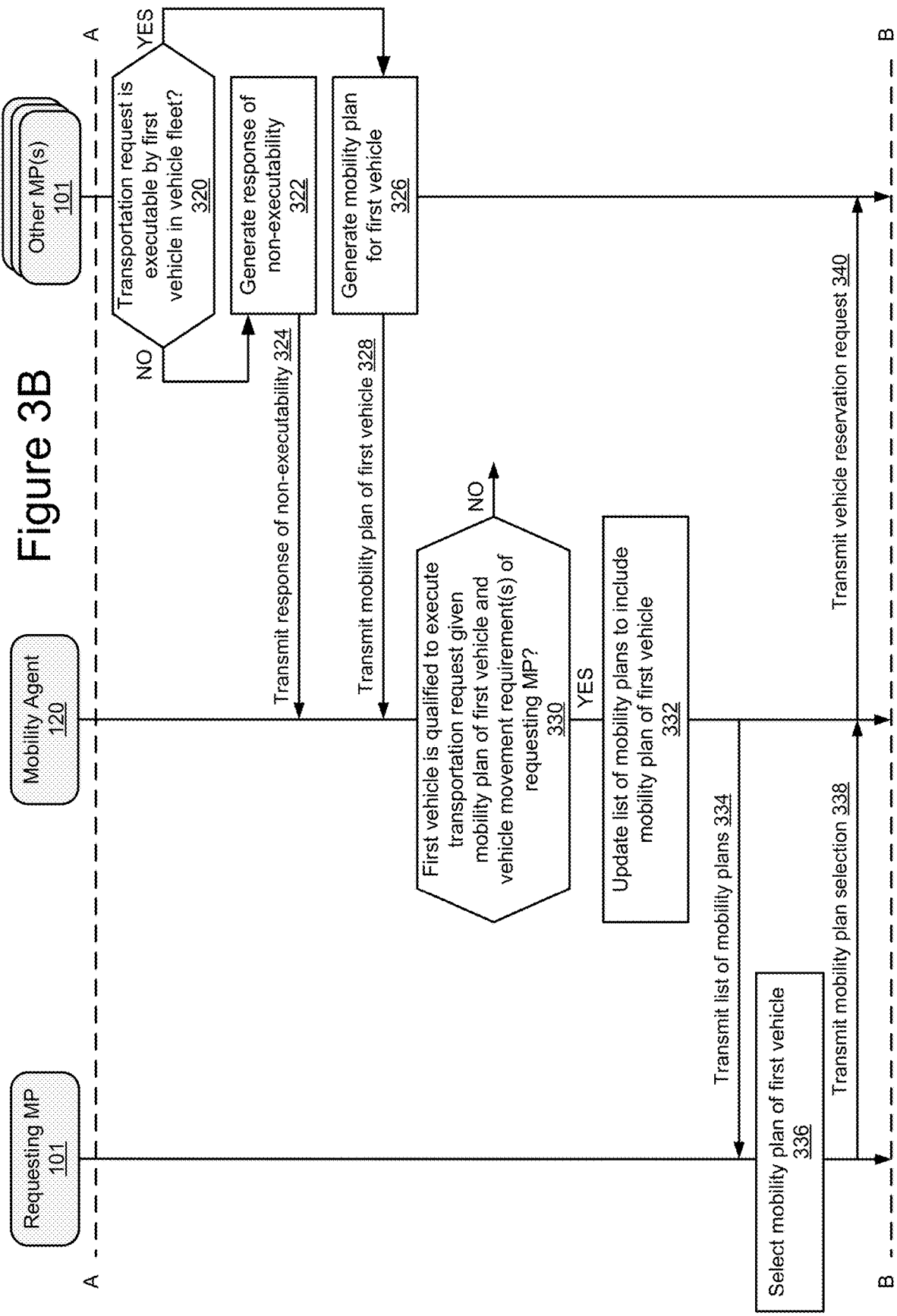

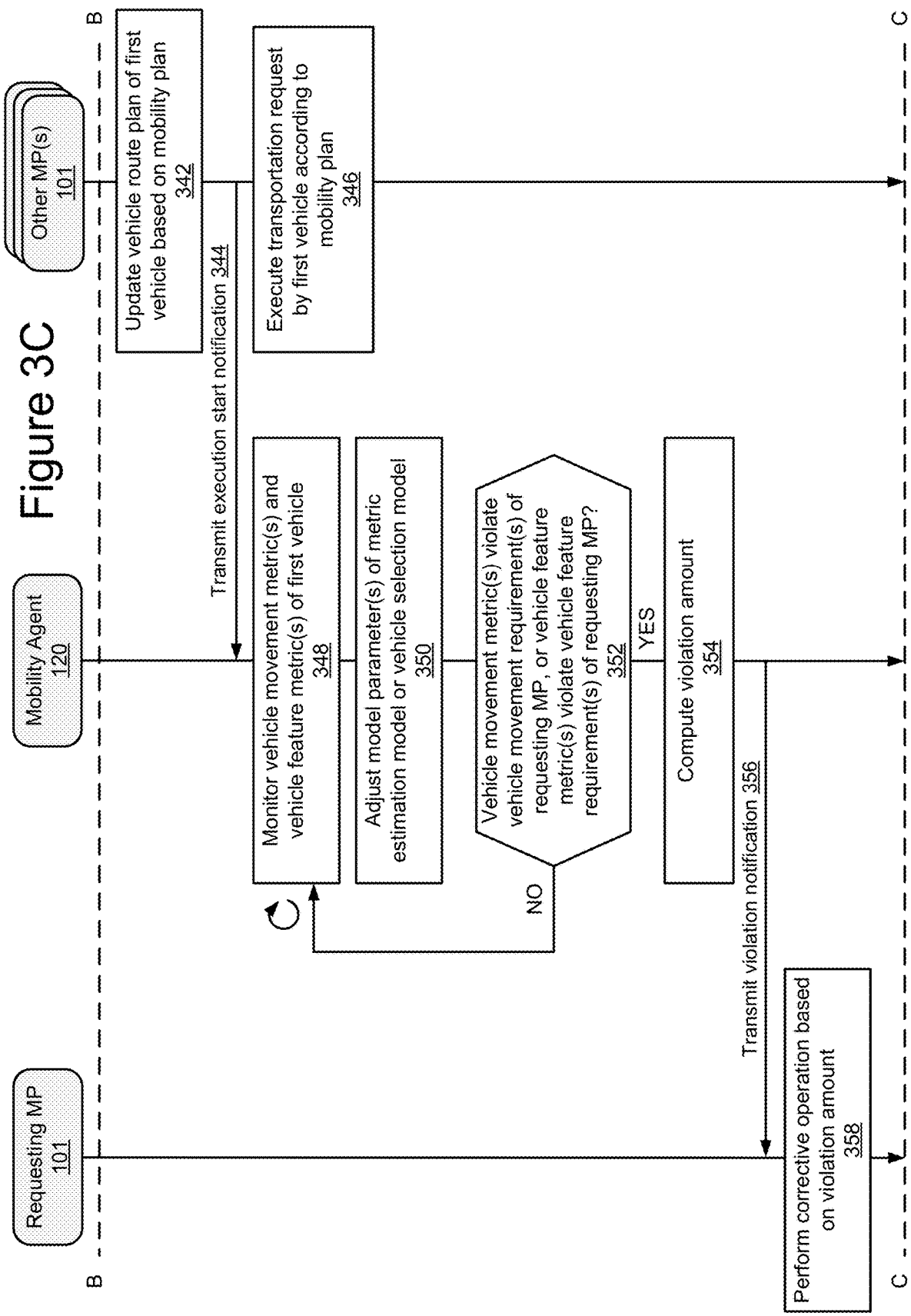

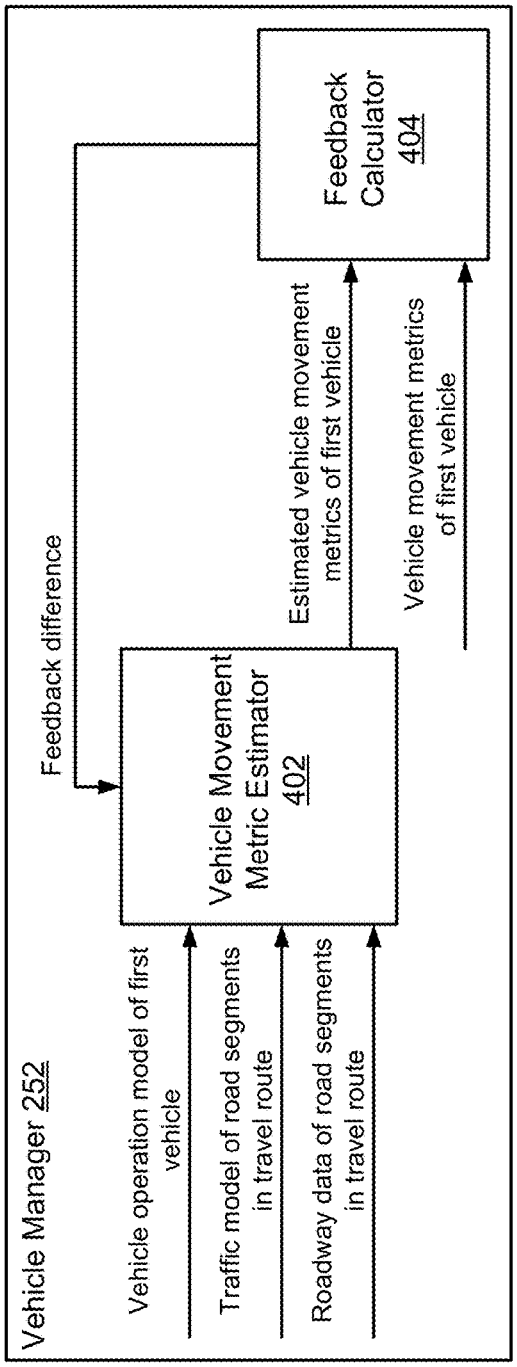
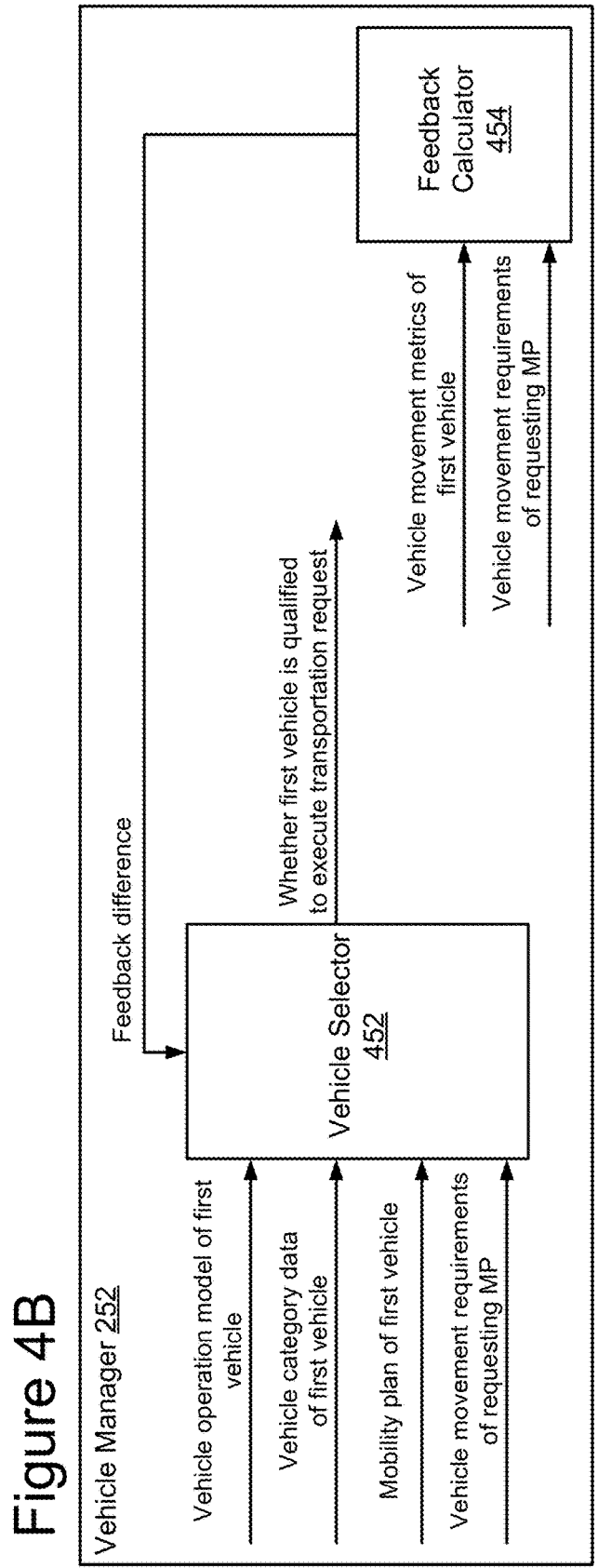

MANAGING VEHICLES USING MOBILITY AGENT

BACKGROUND

The present disclosure relates to managing vehicles. In a more particular example, the disclosure relates to technologies for managing vehicles using mobility agents.

Providers often have multiple vehicles to provide transportation capability to their users. However, as the transportation demand of the users may drastically change over time, it is challenging for the providers to adapt their number of vehicles accordingly. Today, some providers often maintain a sufficient number of vehicles to meet the peak transportation demand of their users. However, this existing solution is generally expensive and often results in low cost efficiency of the vehicles when the transportation demand is relatively low. Other providers usually maintain a number of vehicles corresponding to the average transportation demand to improve the cost efficiency of the vehicles. However, these providers are generally unable to provide the transportation capability to all requesting users when the transportation demand of these users exceeds the average transportation demand that the providers can accommodate.

SUMMARY

The subject matter described in this disclosure overcomes the deficiencies and limitations of the existing solutions by providing novel technology for managing vehicles.

According to one innovative aspect of the subject matter described in this disclosure, a computer-implemented method comprises: receiving, from a server of a requesting mobility provider (MP) via an electronic communication network, one or more request parameters of a transportation request and one or more vehicle movement requirements of the requesting MP; selecting, from a plurality of vehicle profiles of other MPs, one or more first vehicle profiles of one or more first MPs based on the one or more request parameters of the transportation request, the one or more first vehicle profiles including a first vehicle profile representing a first vehicle of a first MP; receiving, from a server of the first MP, a mobility plan for the first vehicle to execute the transportation request, the mobility plan of the first vehicle being generated based on the one or more request parameters of the transportation request and an operational protocol of the first MP; determining that the first vehicle is qualified to execute the transportation request using the one or more vehicle movement requirements of the requesting MP and the mobility plan of the first vehicle; and responsive to determining that the first vehicle is qualified to execute the transportation request, providing the mobility plan of the first vehicle to the server of the requesting MP via the electronic communication network.

In general, another innovative aspect of the subject matter described in this disclosure may be embodied in computer-implemented methods comprising: receiving, from a server of a requesting mobility provider (MP) via an electronic communication network, one or more request parameters of a transportation request and one or more vehicle movement requirements of the requesting MP; selecting, from a plurality of vehicle profiles of other MPs, one or more first vehicle profiles of one or more first MPs based on the one or more request parameters of the transportation request, the one or more first vehicle profiles including a first vehicle profile representing a first vehicle of a first MP; receiving, from a server of the first MP, a mobility plan for the first vehicle to execute the transportation request, the mobility plan of the first vehicle being generated based on the one or more request parameters of the transportation request and an operational protocol of the first MP; determining, using a vehicle selection model, that the first vehicle is qualified to execute the transportation request using the one or more vehicle movement requirements of the requesting MP and the mobility plan of the first vehicle; and responsive to determining that the first vehicle is qualified to execute the transportation request, providing the mobility plan of the first vehicle to the server of the requesting MP via the electronic communication network.

In general, another innovative aspect of the subject matter described in this disclosure may be embodied in systems comprising: one or more processors; and one or more memories storing instructions that, when executed by the one or more processors, cause the system to: receive, from a server of a requesting mobility provider (MP) via an electronic communication network, one or more request parameters of a transportation request and one or more vehicle movement requirements of the requesting MP; select, from a plurality of vehicle profiles of other MPs, one or more first vehicle profiles of one or more first MPs based on the one or more request parameters of the transportation request, the one or more first vehicle profiles including a first vehicle profile representing a first vehicle of a first MP; receive, from a server of the first MP, a mobility plan for the first vehicle to execute the transportation request, the mobility plan of the first vehicle being generated based on the one or more request parameters of the transportation request and an operational protocol of the first MP; determine that the first vehicle is qualified to execute the transportation request using the one or more vehicle movement requirements of the requesting MP and the mobility plan of the first vehicle; and responsive to determining that the first vehicle is qualified to execute the transportation request, provide the mobility plan of the first vehicle to the server of the requesting MP via the electronic communication network.

These and other implementations may each optionally include one or more of the following features: that determining that the first vehicle is qualified to execute the transportation request includes computing, using a metric estimation model, one or more estimated vehicle movement metrics of the first vehicle traveling according to the mobility plan, and determining that the one or more estimated vehicle movement metrics of the first vehicle satisfy the one or more vehicle movement requirements of the requesting MP; that the mobility plan of the first vehicle includes a travel route of the first vehicle from a pick-up point to a destination point of the transportation request, the travel route of the first vehicle including one or more road segments, and computing the one or more estimated vehicle movement metrics of the first vehicle traveling according to the mobility plan includes computing, using the metric estimation model, the one or more estimated vehicle movement metrics of the first vehicle using a vehicle operation model of the first vehicle, roadway data of the one or more road segments in the travel route, and a traffic model of the one or more road segments in the travel route; that receiving, from the server of the requesting MP, a plan selection selecting the mobility plan of the first vehicle to execute the transportation request, monitoring one or more vehicle movement metrics of the first vehicle during an execution of the transportation request by the first vehicle according to the mobility plan, computing a feedback value based on a vehicle movement metric of the first vehicle and an estimated vehicle movement metric of the first vehicle, and adjusting one or more model parameters of the metric estimation model based on the feedback value; that determining that the first vehicle is qualified to execute the transportation request includes determining, using a vehicle selection model, that the first vehicle is qualified to execute the transportation request using vehicle category data of the first vehicle, a vehicle operation model of the first vehicle, the mobility plan of the first vehicle, and the one or more vehicle movement requirements of the requesting MP; that receiving, from the server of the requesting MP, a plan selection selecting the mobility plan of the first vehicle to execute the transportation request, monitoring one or more vehicle movement metrics of the first vehicle during an execution of the transportation request by the first vehicle according to the mobility plan, computing a feedback value based on a vehicle movement metric of the first vehicle and a vehicle movement requirement of the requesting MP, and adjusting one or more model parameters of the vehicle selection model based on the feedback value; that the one or more request parameters of the transportation request include one or more of a number of vehicle users, a luggage space, a pick-up point, a destination point, and a pick-up time of the transportation request, the one or more vehicle movement requirements of the requesting MP specify one or more of a waiting time, a traveling time, a vehicle speed, an acceleration/deceleration rate, a vehicle vibration metric, and an interior noise level, the mobility plan of the first vehicle includes one or more of a travel route of the first vehicle from the pick-up point to the destination point of the transportation request, an estimated pick-up time, an estimated arrival time, and a mobility usage cost, and the travel route of the first vehicle from the pick-up point to the destination point of the transportation request is determined based on a vehicle route plan of the first vehicle and a route calculation model implemented by the first MP; that selecting the one or more first vehicle profiles of the one or more first MPs includes selecting the one or more first vehicle profiles representing one or more first vehicles that have an available user space and an available luggage space satisfying a number of vehicle users and a luggage space of the transportation request; that selecting the one or more first vehicle profiles of the one or more first MPs includes selecting the one or more first vehicle profiles representing the one or more first vehicles that have a distance between a vehicle location of the one or more first vehicles and a pick-up point of the transportation request satisfying a distance threshold; that receiving, from the server of the requesting MP, one or more vehicle feature requirements of the requesting MP, and selecting the one or more first vehicle profiles of the one or more first MPs includes selecting the one or more first vehicle profiles representing one or more first vehicles that satisfy the one or more vehicle feature requirements of the requesting MP; that the one or more vehicle feature requirements of the requesting MP specify one or more of a driving assistance feature, an infotainment feature, a seat type, a legroom size, an interior temperature, an interior humidity level, and a food and beverage option; that receiving, from the server of the requesting MP, a plan selection selecting the mobility plan of the first vehicle to execute the transportation request, monitoring one or more vehicle movement metrics of the first vehicle during an execution of the transportation request by the first vehicle according to the mobility plan, determining that a vehicle movement metric of the first vehicle violates a vehicle movement requirement of the requesting MP, and responsive to determining that the vehicle movement metric of the first vehicle violates the vehicle movement requirement of the requesting MP, notifying a violation of the vehicle movement requirement to the server of the requesting MP; that computing a violation amount based on the vehicle movement metric of the first vehicle and the vehicle movement requirement of the requesting MP, and adjusting a travel cost associated with the transportation request based on the violation amount; that computing a violation amount based on the vehicle movement metric of the first vehicle and the vehicle movement requirement of the requesting MP, determining that the violation amount satisfies a violation amount threshold, and responsive to determining that the violation amount satisfies the violation amount threshold, providing a maintenance operation to the first vehicle.

Other implementations of one or more of these and other aspects include corresponding systems, apparatus, and computer programs, configured to perform the actions of methods, encoded on non-transitory computer storage devices.

The novel technology for managing vehicles of mobility providers presented in this disclosure is particularly advantageous in a number of respects. For example, the technology described herein is capable of enabling a first mobility provider (MP) to temporarily utilize a vehicle of a second MP to execute a transportation request that is requested by a user of the first MP. Thus, even when the first MP does not have sufficient transportation capacity to itself execute the transportation request, the first MP can still provide the transportation capability to its user by utilizing the vehicle of the second MP, and thus the user experience with the first MP can be improved. As a further example, the technology described herein enables the first MP that requires additional transportation capacity to utilize the available transportation capacity of the second MP, and therefore the first MP and the second MP can dynamically adapt their transportation capacity as needed. As a result, these MPs can avoid the need to maintain a large number of vehicles without degrading the availability of their transportation service. The MPs can also maximize the overall utilization of the vehicles in their vehicle fleet as these vehicles can be utilized to perform the transportation requests for other MPs.

In addition, the technology described herein implements a mobility agent to initiate and manage the utilization of the vehicle of the second MP to execute the transportation request of the first MP. This implementation is flexible and efficient because it does not require the MPs to form a direct communication channel with one another. This implementation also does not require the first MP to establish multiple vehicle utilization agreements with a large number of other MPs in advance, while these MPs may not have available transportation capacity to provide to the first MP when needed. Furthermore, the mobility agent can determine the vehicle of the second MP that satisfies the vehicle feature requirements of the first MP, receive the mobility plan of the vehicle from the second MP, and determine whether the execution of the transportation request by the vehicle of the second MP according to the mobility plan satisfies the vehicle movement requirements of the first MP. Therefore, the mobility agent can provide the first MP with the mobility plans of the vehicles that satisfy the operational protocol of the first MP without disclosing the operational protocol of the first MP to the second MP and vice versa. This implementation is also advantageous, because the first MP can provide the transportation capability to its user with a consistent quality of service (QoS) even if the transportation request of the user is executed using the vehicle of the second MP.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIGS. 3A-3D illustrate a flowchart of an example method for managing the vehicles of the mobility providers using the mobility agent.

FIG. 4A is a block diagram of an example metric estimation model.

FIG. 4B is a block diagram of an example vehicle selection model

DESCRIPTION

Figure 1A:
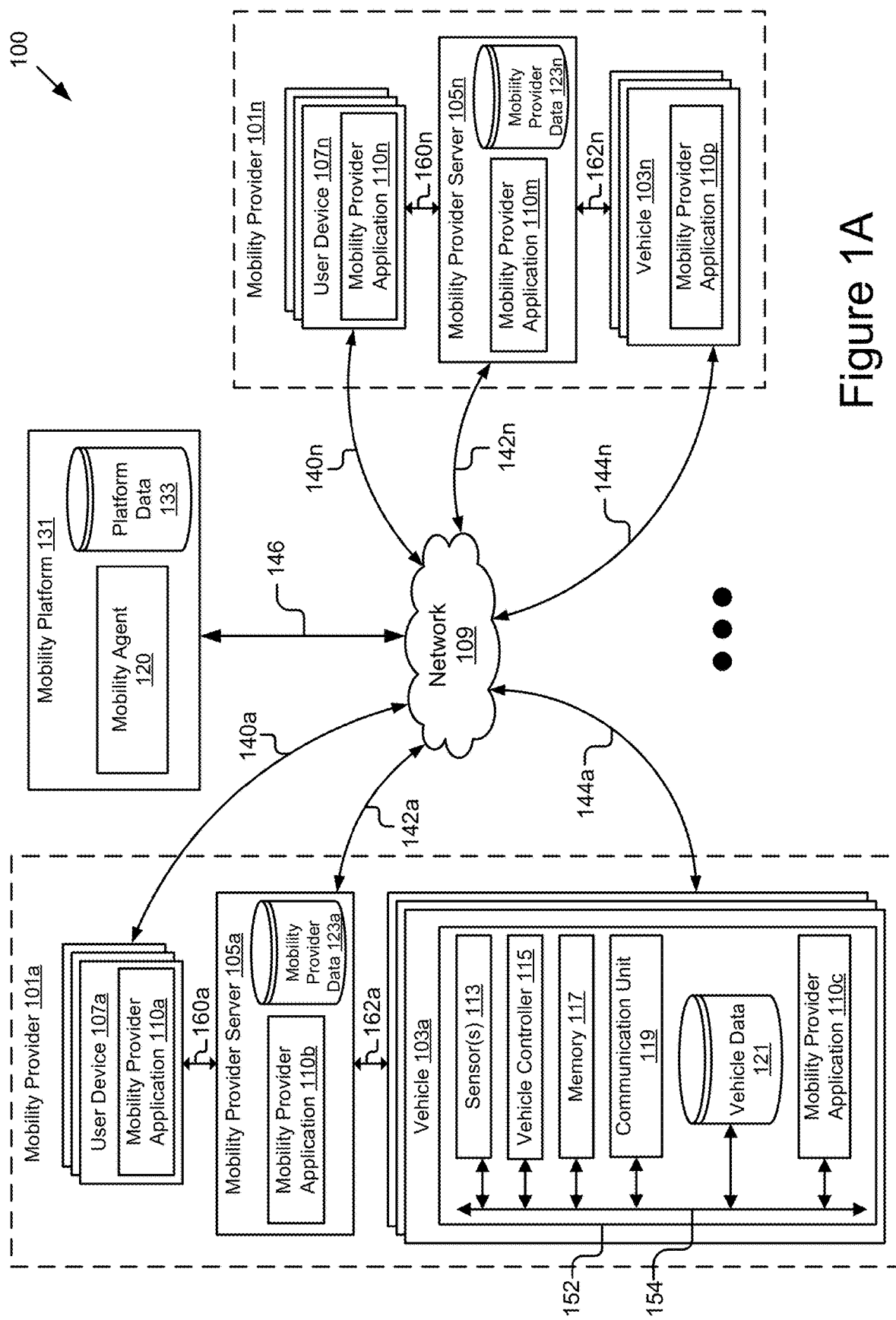
FIGS. 1A and 1B illustrate block diagrams of example systems for managing vehicles of mobility providers using a mobility agent.

The technology described herein can effectively manage vehicles of multiple mobility providers using a mobility agent. As described in further detail below, the technology includes various aspects, such as vehicle management methods, systems, computing devices, computer program products, and apparatuses, among other aspects.

An example mobility agent can be implemented on a mobility platform. When a requesting mobility provider (MP) temporarily requires additional transportation capacity to accommodate a transportation request from its user, the mobility agent enables the requesting MP to utilize the transportation capacity of another MP to carry out the transportation request. The additional transportation capacity that the requesting MP needs may be less than the capacity of one vehicle. In some embodiments, the mobility agent may identify one or more first vehicles of one or more first MPs that can potentially provide a portion of their transportation capacity to the requesting MP, verify with the first MPs whether the first vehicles can actually be utilized to execute the transportation request, collect the mobility plans of the first vehicles based on which the first vehicles may execute the transportation request and corresponding mobility usage costs, and provide the mobility plans of the first vehicles to the requesting MP. In some embodiments, as the requesting MP or the user of the requesting MP selects a mobility plan of a first vehicle belonging to a first MP to execute the transportation request, the mobility agent may reserve the first vehicle to execute the transportation request with the first MP. The mobility agent may also monitor the vehicle status data of the first vehicle during the execution of the transportation request to make sure that the transportation request is properly conducted. Once the execution of the transportation request is completed, the mobility agent may facilitate the payment of the mobility usage cost from the requesting MP that utilize the transportation capacity of the first vehicle to execute its transportation request to the first MP that provided the transportation capacity of the first vehicle.

An example mobility agent for managing vehicles of multiple mobility providers may receive a mobility usage request from a mobility provider server (MP server) of a requesting MP, the mobility usage request may specify request parameter(s) of a transportation request, vehicle feature requirement(s) of the requesting MP, and vehicle movement requirement(s) of the requesting MP. The mobility agent may select, from a plurality of vehicle profiles of other MPs, one or more first vehicle profiles representing one or more first vehicles of one or more first MPs based on the request parameter(s) of the transportation request and the vehicle feature requirement(s) of the requesting MP. Among the one or more first vehicles of the one or more first MPs, the mobility agent may receive from a MP server of a first MP a mobility plan for a first vehicle of the first MP to execute the transportation request. The MP server of the first MP may generate the mobility plan for the first vehicle based on the request parameter(s) of the transportation request and an operational protocol of the first MP. The mobility agent may then determine whether the first vehicle is qualified to execute the transportation request based on the vehicle movement requirement(s) of the requesting MP and the mobility plan of the first vehicle.

Responsive to determining that the first vehicle is qualified to execute the transportation request, the mobility agent may provide the mobility plan of the first vehicle to the MP server of the requesting MP. The MP server of the requesting MP or the user of the requesting MP may select the mobility plan of the first vehicle to execute the transportation request, and thus the first vehicle of the first MP may execute the transportation request according to the mobility plan. During the execution of the transportation request by the first vehicle according to the mobility plan, the mobility agent may monitor vehicle feature metric(s) and vehicle movement metric(s) of the first vehicle to detect a requirement violation of the vehicle feature requirement(s) or the vehicle movement requirement(s) of the requesting MP. If the requirement violation is detected, the mobility agent may notify the MP server of the requesting MP about the requirement violation, and the MP server of the requesting MP may perform a corrective operation accordingly.

FIG. 1A is a block diagram of an example system 100 for managing service vehicles of multiple mobility providers. As shown, the system 100 includes a mobility platform 131 and one or more mobility providers (MP) 101a ... 101n. As depicted, the MP 101 may include a mobility provider server (MP server) 105, a vehicle fleet including one or more vehicles 103, and one or more user devices 107 of one or more users that use the transportation capability provided by the MP 101. In some embodiments, the user devices 107 may be communicatively coupled to the MP server 105 as reflected by the signal line 160, and the MP server 105 may be communicatively coupled to the vehicles 103 as reflected by the signal line 162. In some embodiments, the user devices 107, the MP server 105, and the vehicles 103 of the MP 101 may be communicatively coupled to one another and/or to other entities of the system 100 (e.g., the mobility platform 131, other MPs 101, etc.) via the network 109 through the signal lines 140, 142, and 144, respectively. As depicted in FIG. 1A, the mobility platform 131 may be communicatively coupled to other entities of the system 100 (e.g., the MP server 105 and/or the vehicles 103 of the MPs 101, etc.) via the network 109 through the signal line 146. In some embodiments, the mobility platform 131 may be implemented in one or more servers. The one or more servers may be centralized or distributed physical and/or virtual servers, or a combination of the foregoing, that can manage, coordinate and/or instruct other computing entities (e.g., MP servers 105, vehicles 103, etc.) based on rules, logic, data being received, data that is needed, etc. Any other suitable architecture may also be utilized.

Figure 1B:
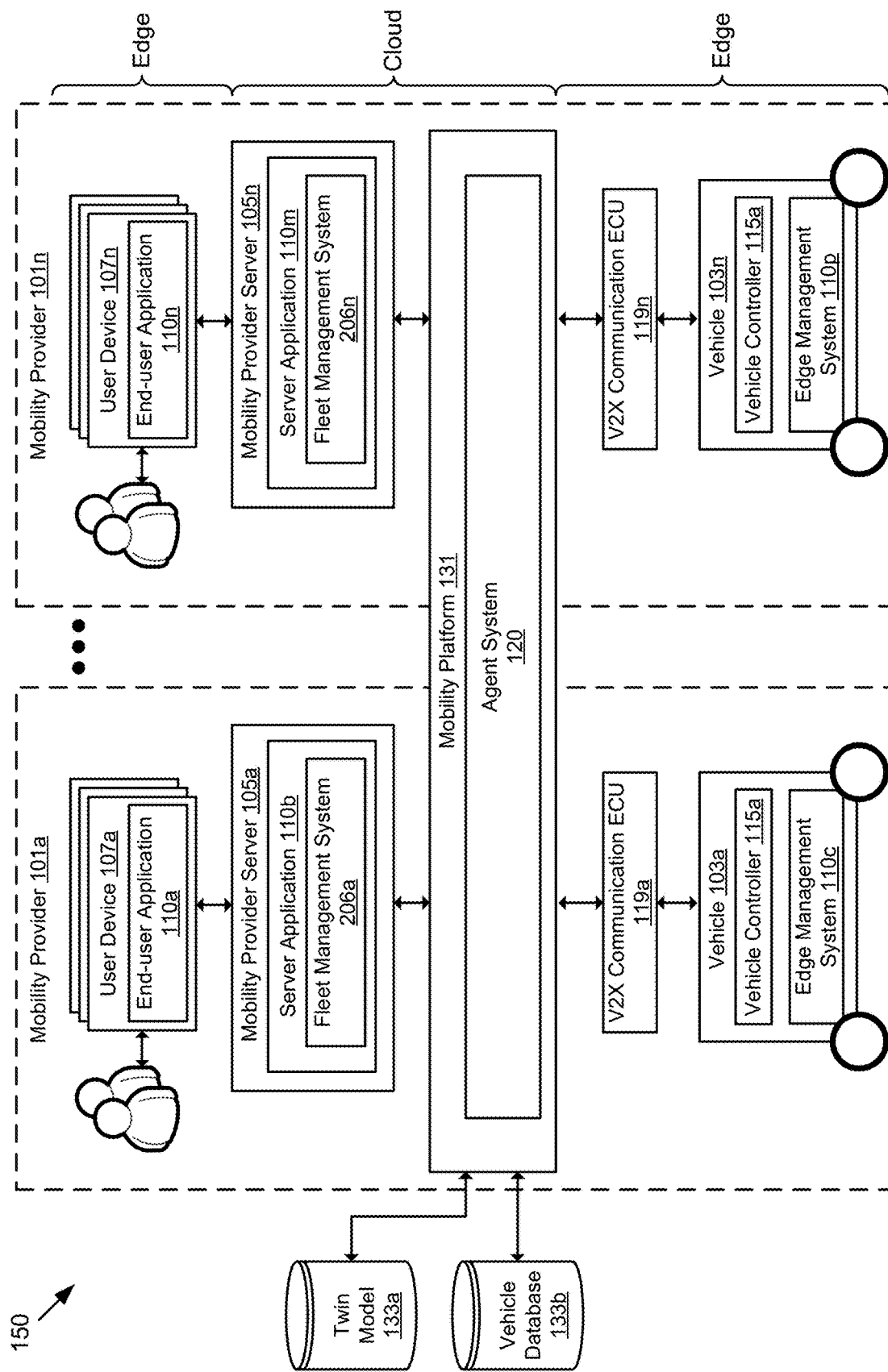

FIG. 1B is a block diagram of another example system 150 for managing service vehicles of multiple mobility providers. As shown, the system 150 may also include the mobility platform 131 and the one or more MP 101a . . . 101n. The user may use the end-user application 110 associated with a particular MP 101 on the user device 107 to communicate with the MP server 103 of the MP 101. For example, the user may use the end-user application 110 to send and receive various types of data (e.g., mobility request, information about vehicle availability, etc.) to and from the server application 110b implemented on the MP server 103 of the MP 101, thereby using the transportation service provided by the MP 101. As depicted, the server application 110b may include a fleet management system 206 that can manage and control the vehicles 103 in the vehicle fleet of the MP 101, manage the execution and/or assignment of the transportation requests requested by the users of the MP 101, etc. In some embodiments, the fleet management system 206 may manage the vehicles 103 in the vehicle fleet of the MP 101 using the management interface provided by the mobility platform 131. The mobility platform 131 may communicate with these vehicles 103 via the V2X communication ECU 119, which provides the communication capability for the vehicles 103 to send and receive data (e.g., vehicle status data, travel route, etc.) to and from the MP server 105 of the MP 101, the mobility platform 131, etc. In some embodiments, the V2X communication ECU 119 may also enable the components of the vehicle 103 (e.g., the vehicle controller 115, the edge management system 110, etc.) to communicate with one another. The components of the vehicle 103 may be controlled by one or more vehicle controllers 115.

In some embodiments, the vehicles 103 in the vehicle fleet of the MP 101 may include an edge management system 110c that implements the functionalities, policies, operational protocols, etc., such as but not limited to those specific and/or unique to the MP 101. For example, the edge management system 110c may implement the routing function adopted by the MP 101. Alternatively, the routing function may be implemented in the fleet management server 101 of the MP server 105, and the route computed by the routing function may be communicated to the vehicle 103 via the V2X communication ECU 119 through the management interface provided by the mobility platform 131. In some embodiments, the MP server 105 and/or the mobility platform 131 may be implemented in one or more cloud servers (which may include one or more centralized or distributed physical and/or virtual server(s) as discussed above), while the other components (e.g., the end-user application 110a, the edge management system 110c, etc.) may be considered as being implemented at the edge-level of the system architecture (e.g., in the user device 107, the vehicle 103, etc.).

In some embodiments, the mobility platform 131 may include an agent system 120 that manages and coordinates the utilization of the vehicle 103 belonging to a MP 101 to perform a transportation request for another MP 101. To perform its operation, the agent system 120 may rely on the twin model 133a and the vehicle database 133b in the data store of the mobility platform 131. In some embodiments, the vehicle database 133b may store the vehicle status data of the vehicles 103 belonging to various MPs 101 and other types of data. In some embodiments, the twin model 133 may include the roadway data, the traffic model, etc., that model the road condition and the traffic condition of various road segments, the vehicle operation model that models the vehicle behaviors of the corresponding vehicle 103, etc. The operations of the agent system 120 are described in details below.

In FIG. 1A and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1A is provided by way of example and the system 100 and/or further systems contemplated by this present disclosure may include additional and/or fewer components, may combine components and/or divide one or more of the components into additional components, etc. For example, the system 100 may include any number of networks 109, mobility service platforms 131, or MPs 101, and the MP 101 may include any number of MP servers 105, vehicles 103, or user devices 107.

The network 109 may be a conventional type, wired and/or wireless, and may have numerous different configurations including a star configuration, token ring configuration, or other configurations. For example, the network 109 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 109 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 109 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-cloud (V2C) networks, vehicle-to-infrastructure/infrastructure-to-vehicle (V2I/I2V) networks, vehicle-to-infrastructure/infrastructure-to-cloud (V2I/I2C) networks, or any other wireless networks. Although FIG. 1A illustrates a single block for the network 109 that couples to the mobility platform 131 and the MP(s) 101, it should be understood that the network 109 may in practice comprise any number of combination of networks, as noted above.

The mobility service provider(s) (MP) 101 may provide transportation capability to the users of the MP(s) 101. As examples of the transportation capability provided by the MP 101, the MP 101 may provide shared trips and/or non-shared trips, provide vehicle rental sessions, deliver user packages, etc., to the user. As depicted in FIG. 1A, the MP 101 may include the MP server 105, the vehicle(s) 103, and the user device(s) 107 of the users that use the transportation capability of the MP 101.

The user device(s) 107 may be a hardware and/or virtual electronic device that includes a processor, a memory, and network communication capabilities (e.g., a communication unit). The user device 107 may be communicatively coupled to the MP server 105 of the MP 101 as reflected by signal line 160, and communicatively coupled to the network 109 as reflected by signal line 140. In some embodiments, the user device 107 may send and receive data to and from the MP server 105 of the MP 101 and/or other entities of the system 100 (e.g., the vehicles 103, the mobility platform 131, and/or the MP servers 105 of other MPs 101, etc.). As depicted in FIG. 1A, the user device 107 may include an instance 110a of a mobility provider application (MP application) 110 corresponding to the MP 101, the MP application 110a may provide various user interfaces with various application functionalities for the user to interact with the MP server 105 of the MP 101. Thus, the user of the user device 107 may launch the MP application 110a on the user device 107 to use the transportation capability of the MP 101 through various interactions with the MP server 105 (e.g., initiating a transportation request, selecting a mobility plan, receiving an execution status of the transportation request, etc.). In some embodiments, the MP application 110a may be implemented in the form of a stand-alone application and/or a web application accessible through a web browser on the user device 107. Non-limiting examples of the user device 107 include desktop computers, laptop computers, notebook computers, smartphones, tablets, personal digital assistants, or any other suitable electronic devices capable of implementing the MP application 110.

The vehicle(s) 103 may include computing device(s) 152 having sensor(s) 113, vehicle controller(s) 115, memory(ies) 117, communication unit(s) 119, a vehicle data store 121, and an instance 110c of the MP application 110. Examples of computing device(s) 152 may include virtual or physical computer processors, control units, micro-controllers, etc., which are coupled to other components of the vehicle(s) 103, such as one or more sensors 113, actuators, motivators, etc. In some embodiments, the vehicle(s) 103 may be included in the vehicle fleet of the MP 101, and thus may be managed by the MP server 105 of the MP 101. The vehicle(s) 103 may be communicatively coupled to the MP server 105 of the MP 101 via the signal line 162, and communicatively coupled to the network 109 via the signal line 144. The vehicle(s) 103 may send and receive data to and from the MP server 105 of the MP 101, the mobility platform 131, and/or other entities of the system 100 (e.g., the user devices 107 and/or other vehicles 103 of the MP 101, etc.). In some embodiments, the vehicle(s) 103 are capable of transporting from one point to another. Non-limiting examples of the vehicle(s) 103 include a vehicle, an automobile, a bus, a boat, a plane, a bionic implant, a robot, or any other platforms with non-transitory computer electronics (e.g., a processor, a memory or any combination of non-transitory computer electronics).

The vehicle controller(s) 115 may execute software instructions (e.g., tasks) by performing various input/output, logical, and/or mathematical operations. The vehicle controller(s) 115 may have various computing architectures to process data signals. The vehicle controller(s) 115 may be physical and/or virtual, and may include a single core or plurality of processing units and/or cores. In the context of the vehicle 103, the vehicle controller(s) 115 may be an electronic control unit (ECU) implemented in the vehicle 103 such as a car, although other types of vehicle are also possible and contemplated. The ECUs may receive and store the sensor data (e.g., the location data, the speed data, etc.) as vehicle status data in the vehicle data store 121 for access and/or retrieval by the MP application 110. The ECUs may also control various actuators (e.g., speed actuators, steering actuators, etc.), motivators (e.g., engines, motors, transmissions, brakes, etc.), mechanical/electrical components (e.g., air conditioning units, vehicle lights, infotainment systems, safety systems, etc.) of the vehicle 103.

In some embodiments, the vehicle controller(s) 115 may be capable of generating and providing electronic display signals to the input/output device(s), capturing and transmitting images, performing complex tasks including various types of vehicle status monitoring and transportation request execution, etc. In some embodiments, the vehicle controller(s) 115 may implement operational protocol of the MP 101 to which the vehicle 103 belongs. For example, the vehicle controller(s) 115 may configure various component systems of the vehicle 103 (e.g., autonomous driving systems, infotainment systems, navigation systems, etc.) according to specific vehicle configurations of the MP 101, implement various computation models specific to the MP 101 (e.g., route calculation model, etc.), etc. As a result, the vehicle 103 may execute the transportation request in a manner specific to the MP 101. In some embodiments, the vehicle controller(s) 115 may be coupled to the memory(ies) 117 via the bus 154 to access data and instructions therefrom and store data therein. The bus 154 may couple the vehicle controller(s) 115 to the other components of the vehicle(s) 103 including, for example, the sensor(s) 113, the memory(ies) 117, the communication unit(s) 119, and/or the vehicle data store 121.

The MP application 110 is computer logic executable to provide the transportation capability of the MP 101 to the users. In some embodiments, the MP application 110 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, each MP 101 may implement a different MP application 110 to conduct and manage its transportation service in a different manner. As illustrated in FIG. 1A, for each MP 101, the user devices 107 may include the instance 110a, the MP server 105 may include the instance 110b, and the vehicles 103 may include the instances 110c of the MP application 110. In some embodiments, each instance 110a, 110b, and 110c may comprise one or more components the MP application 110 depicted in FIG. 2A, and may be configured to fully or partially perform the functionalities described herein depending on where the instance resides.

As an example, if the MP application 110 is implemented in the user device 107, the MP application 110a may receive transportation requests and user inputs, render information related to the transportation requests to the user via the user interface, etc. If the MP application 110 is implemented in the MP server 105, the MP application 110b may process the transportation requests, manage and deploy the vehicles 103 of the MP 101 to execute the transportation requests, cooperate with the mobility platform 131 to provide the available transportation capacity of the MP 101 to other MPs 101, or to utilize the available transportation capacity of other MPs 101 to execute the transportation requests of the MP 101 when needed, etc. If the MP application 110 is implemented in the vehicle 103, the MP application 110c may execute the transportation requests in conformity with the operational protocol of the MP 101, periodically transmit vehicle status data of the vehicle 103 to the MP server 105 of the MP 101 and the mobility platform 131, etc. The MP application 110 may also receive and/or process the request data, the vehicle status data, etc., and communicate with other elements of the vehicle 103 via the bus 154, such as the memory 117, the communication unit 119, the vehicle data store 121, etc. The MP application 110 is described in details below with reference to at least FIGS. 2A-4B.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the vehicle controller(s) 115. For example, the memory(ies) 117 may store the MP application 110. In some implementations, the memory(ies) 117 may include one or more of volatile memory and non-volatile memory. For example, the memory(ies) 117 may include, but is not limited to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory(ies) 117 may be a single device or may include multiple types of devices and configurations.

The communication unit 119 transmits data to and receives data from other computing devices to which it is communicatively coupled using wireless and/or wired connections. In some embodiments, the communication unit 119 may couple to the MP server 105 via the signal line 162 and couple to the network 109 via the signal line 144. Thus, various components of the vehicle 103 (e.g., the vehicle controller 115, the MP application 110, etc.) may send and receive data to and from the MP server 105, the mobility platform 131, and/or other entities of the system 100 through the communication unit 119. The communication unit 119 may include one or more wired interfaces and/or wireless transceivers for sending and receiving data. The communication unit 119 may exchange data with other computing nodes using standard communication methods, such as those discussed above.

The sensor(s) 113 includes any type of sensors suitable for the vehicle(s) 103. The sensor(s) 113 may be configured to collect any type of signal data suitable to determine characteristics of the vehicle 103 and/or its internal and external environments. Non-limiting examples of the sensor(s) 113 include various optical sensors and/or image sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors (e.g., Global Positioning System (GPS) sensors), orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle 103 in order to capture the situational context surrounding the vehicle 103.

The vehicle data store 121 includes a non-transitory storage medium that stores various types of data. For example, the vehicle data store 121 may store vehicle data being communicated between different components of a given vehicle 103 using a bus, such as a controller area network (CAN) bus. In some embodiments, the vehicle data may include vehicle status data collected from multiple sensors 113 coupled to different components of the vehicle 103 for monitoring operating states of these components at various timestamps. In some embodiments, for each timestamp, the vehicle status data may include one or more vehicle movement metrics describing the vehicle movement of the vehicle 103, e.g., vehicle location (e.g., GPS coordinates), vehicle orientation, vehicle speed, vehicle acceleration/deceleration rate, vehicle jerking metric, vehicle vibration metric, interior noise level, wheel speed (Revolutions Per Minute—RPM), steering angle, braking force, etc. In some embodiments, the vehicle status data may also include one or more vehicle feature metrics describing the dynamic feature attributes of the vehicle 103, the dynamic feature attributes may describe the vehicle features of the vehicle 103 that potentially change over time (e.g., interior temperature, interior humidity level, etc.). In some embodiments, the vehicle status data may also include one or more vehicle capacity metrics describing the user capacity and the luggage capacity of the vehicle 103, e.g., total user space and available user space (e.g., number of seats), total luggage space and available luggage space (e.g., number of luggage items), etc. In some embodiments, the vehicle 103 may periodically transmit the vehicle status data of the vehicle 103 to the MP server 105 of the MP 101 to which the vehicle 103 belongs and/or to the mobility platform 131 (e.g., every 2s). Other types of vehicle status data are also possible and contemplated.

In some embodiments, the vehicle data may also include vehicle operation model describing the vehicle behaviors of the vehicle 103. In some embodiments, the vehicle operation model may describe various operation patterns of the vehicle 103, e.g., acceleration/deceleration pattern, braking pattern, steering pattern, kinetic model, etc. Other types of vehicle operation model are also possible and contemplated.

In some embodiments, the vehicle data store 121 may store the vehicle route plan describing the vehicle route along which the vehicle 103 travels, the vehicle route plan may also include one or more stop points on the vehicle route and the corresponding timestamps at which the vehicle 103 reaches the stop points. As an example, the vehicle route plan of the vehicle 103 may indicate that the vehicle 103 will arrive at the first stop point on State St. at 14:00:00, then travel along State St., and arrive at the second stop point on State St. at 14:30:00.

In some embodiments, the vehicle data store 121 may store request data describing the transportation requests assigned to the vehicle 103 for execution. In some embodiments, for each transportation request, the request data stored in the vehicle data store 121 may include the request identifier (ID) uniquely identifying the transportation request, the request parameters of the transportation request (e.g., number of vehicle users, luggage space, pick-up point, pick-up time, destination point, etc.), etc. In some embodiments, the vehicle data store 121 may also store execution data describing the execution of the transportation requests by the vehicle 103. In some embodiments, the execution data may include the request ID of the transportation request, the travel route that the vehicle 103 follows to execute the transportation request, the execution status of the transportation request (e.g., completed, in-progress, 85% completed, etc.), etc.

In some embodiments, the vehicle data store 121 may store a vehicle identifier (ID) uniquely identifying the vehicle 103 (e.g., Vehicle Identification Number (VIN)), and vehicle category data describing the vehicle category of the vehicle platform 103. Non-limiting examples of the vehicle category data include, but are not limited to, vehicle type (e.g., sedan, crossover, etc.), vehicle year (e.g., 2016), vehicle manufacturer (e.g., Toyota), vehicle model (e.g., Prius), etc. Other types of vehicle category data are also possible and contemplated.

The MP server 105 may include a hardware and/or virtual server that includes a processor, a memory, and network communication capabilities (e.g., a communication unit). As depicted, the MP server 105 may be communicatively coupled to the user devices 107 via the signal line 160, communicatively coupled to the vehicles 103 of the MP 101 via the signal line 162, and communicatively coupled to the network 109 via the signal line 142. In some embodiments, the MP server 105 may send and receive data to and from other entities of the system 100 (e.g., the mobility platform 131, the MP servers 105 of other MPs 101, etc.). As illustrated in FIG. 1A, the MP server 105 may include the instance 110b of the MP application 110 and a mobility provider data store (MP data store) 123 that store various types of data for access and/or retrieval by this application.

In some embodiments, the MP application 110b implemented in the MP server 105 may manage the vehicles 103 in the vehicle fleet of the MP 101. For example, the MP application 110b may monitor the vehicle status data of the vehicles 103, deploy the vehicles 103 to execute the transportation requests, compute the vehicle route plan for the vehicles 103, determine parking location for the vehicles 103 when the vehicles 103 are unutilized, etc. In some embodiments, to manage the vehicles 103 of the MP 101, the MP application 110b may control the vehicle controller 115 and/or access the vehicle data store 121 of the vehicles 103 through the management interfaces implemented in the MP server 105 of the MP 101 and/or through the management interfaces provided by the mobility platform 131. As discussed elsewhere herein, the MP application 110b may also cooperate with the mobility platform 131 to provide the available transportation capacity of the MP 101 to other MPs 101, or to utilize the available transportation capacity of other MPs 101 to execute the transportation requests of the MP 101 when necessary.

The MP data store 123 includes a non-transitory storage medium that stores various types of data. For example, the MP data store 123 may store request data of the transportation requests initiated by the users of the MP 101. In some embodiments, for each transportation request, the request data stored in the MP data store 123 may include the request ID of the transportation request, the customer ID uniquely identifying the user that initiated the transportation request, the request parameters and the input parameters provided by the user, etc. In some embodiments, the request parameters may specify the request information that is required to execute the transportation request. For example, the request parameters may include the request type specifying the type of transportation capability requested by the user (e.g., shared ride, vehicle rental, package delivery, etc.), the number of vehicle users (e.g., 2 vehicle users), the luggage space (e.g., 3 standard carry-on items), the pick-up point (e.g., Salt Lake City airport), the pick-up time (e.g., Nov. 5, 2018 at 14:00:00), and the destination point (e.g., University campus) requested by the user. In some embodiments, the input parameters may specify other input information that the user additionally provided for the transportation request. For example, the input parameters may include the seat type (e.g., heated seat), the driver assistance feature (e.g., blind spot alert), the infotainment feature (e.g., Internet radio), the interior temperature (e.g., 24 □C.), the food and beverage option (e.g., diet soft drink), etc., requested by the user. Other types of request data are also possible and contemplated.

In some embodiments, the MP data store 123 may store vehicle data of the vehicles 103 included in the vehicle fleet of the MP 101. In some embodiments, for each vehicle 103, the vehicle data stored in the MP data store 123 may include the vehicle ID, the vehicle category data, the vehicle status data, the vehicle operation model, the vehicle route plan, etc., of the vehicle 103. As discussed elsewhere herein, the vehicle status data may include the vehicle movement metrics describing the vehicle movement of the vehicle 103, the vehicle feature metrics describing the dynamic feature attributes of the vehicle 103, and the vehicle capacity metrics describing the user capacity and the luggage capacity of the vehicle 103. In some embodiments, in addition to the dynamic feature attributes of the vehicle 103, the vehicle data stored in the MP data store 123 may also include static feature attributes describing the vehicle features of the vehicle 103 that may not dynamically change over time. Non-limiting examples of the static feature attributes include, but are not limited to, the seat type, the legroom size, the driver assistance features, the infotainment features, etc., available in the vehicle 103. In some embodiments, the vehicle 103 and/or the MP server 105 may periodically update the vehicle status data of the vehicle 103 in the MP data store 123 (e.g., every 2s).

In some embodiments, the MP data store 123 may store request assignment data describing the assignment of the transportation requests to the vehicles 103. As discussed elsewhere herein, the transportation requests may be assigned to the vehicle 103 of the MP 101 or the vehicle 103 of another MP 101 for execution. In some embodiments, if the transportation request is assigned to the vehicle 103 of the MP 101, the request assignment data may include the request ID of the transportation request, the vehicle ID of the vehicle 103 that executes the transportation request, the execution status of the transportation request, etc. In some embodiments, if the transportation request is assigned to the vehicle 103 of another MP 101, the MP server 105 may not be aware of the vehicle ID of the vehicle 103 that executes the transportation request and/or the MP ID uniquely identifying the MP 101 to which that vehicle 103 belongs. Thus, in this case, the request assignment data may include the request ID of the transportation request and a default value for the vehicle ID (e.g., "hiring vehicle").

In some embodiments, the MP data store 123 may store an operational protocol describing the manner in which the MP 101 provide transportation capability to the users. In some embodiments, the operational protocol of the MP 101 may include one or more vehicle movement requirements that the vehicle movement of the vehicle 103 needs to satisfy as the vehicle 103 executes the transportation requests for the users of the MP 101. In some embodiments, the vehicle movement requirements may specify the value or the value range for various vehicle movement metrics of the vehicle 103. For example, the vehicle movement requirements may specify the value or the value range of the waiting time (e.g., less than 10 minutes), the traveling time (e.g., 5-360 minutes for shared ride), the vehicle speed (e.g., 55-120 km/h), the acceleration/deceleration rate, the vehicle vibration metric, the interior noise level, etc., of the vehicle 103. Other types of vehicle movement requirement are also possible and contemplated.

In some embodiments, the operational protocol of the MP 101 may include one or more vehicle feature requirements that the vehicle features of the vehicle 103 need to satisfy as the vehicle 103 executes the transportation requests for the users of the MP 101. In some embodiments, the vehicle feature requirements may specify the value or the value range for various dynamic feature attributes of the vehicle 103 (e.g., the interior temperature, the interior humidity level, etc.). The vehicle feature requirements may also specify static feature attributes describing the vehicle features available in the vehicle 103. For example, the vehicle feature requirements may specify the seat type, the legroom size, the driving assistance features, the infotainment features, the food and beverage options, etc., of the vehicle 103. Other types of vehicle feature requirement are also possible and contemplated.

In some embodiments, the operational protocol of the MP 101 may specify the computational models and the vehicle configurations of the MP 101. As the vehicles 103 of the MP 101 implement these computational models and vehicle configurations of the MP 101, the vehicles 103 may execute the transportation requests in the manner specific to the MP 101. As an example, the route calculation models that the MPs 101 implement on their vehicles 103 may be different from one another, and thus the vehicles 103 of these MPs 101 may follow different travel routes even if the start point and the end point of these travel routes are the same. In some embodiments, the operational protocol of the MP 101 may specify a request category for the vehicles 103 of the MP 101, and each vehicle 103 of the MP 101 may only execute the transportation requests of the request types included in its request category (e.g., non-shared ride and vehicle rental). In some embodiments, the operational protocol of the MP 101 may also specify a pick-up distance threshold for the vehicles 103 of the MP 101, and the MP server 105 of the MP 101 may only assign the transportation request to the vehicle 103 if the distance between the vehicle location of the vehicle 103 and the pick-up point of the transportation request satisfies the pick-up distance threshold (e.g., less than 3 km). It should be understood that other operational manners and policies may be specified in the operational protocol of the MP 101.

The mobility platform 131 may be a hardware and/or virtual server that includes a processor, a memory, and network communication capabilities (e.g., a communication unit). As depicted, the mobility platform 131 may be communicatively coupled to the network 109 via the signal line 146. In some embodiments, the mobility platform 131 may send and receive data to and from other entities of the system 100 (e.g., the MP server 105 and the vehicles 103 of various MPs 101, etc.) via the network 109. In some embodiments, the mobility platform 131 may provide management interfaces for the MP server 105 of the MP 101 to access and control the vehicles 103 of the MP 101. As illustrated in FIG. 1A, the mobility platform 131 may include a mobility agent 120 and a platform data store 133 that store various types of data for access and/or retrieval by this application.

The mobility agent 120 includes software and/or hardware logic executable to initiate and manage the utilization of transportation capacity provided by one MP 101 to another MP 101. In some embodiments, the mobility agent 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The mobility agent 120 may receive and process the request data, the vehicle data, etc., and communicate with the MP server 105 of the MPs 101. For example, the mobility agent 120 may communicate the request for executing ability, the mobility plan, the violation notification, etc., to the MP server 105 of the requesting MP 101 that requests the transportation capacity and/or the MP server 105 of the first MP 101 that provides the transportation capacity. The mobility agent 120 is described in details below with reference to at least FIGS. 2A-4B.

In some embodiments, the platform data store 133 includes a non-transitory storage medium that stores vehicle profiles of the vehicles 103 in the vehicle fleet of various MPs 101. In some embodiments, the platform data store 133 may not store the vehicle profiles of the vehicles 103 that are exclusively managed and utilized by the MP 101 to which the vehicles 103 belong. The vehicles 103 belonging to the MP 101 may be referred to herein as the vehicle 103 of the MP 101. In some embodiments, for the vehicle 103 of the MP 101, the vehicle profile of the vehicle 103 may include the vehicle ID of the vehicle 103, the MP ID of the MP 101, the vehicle category data of the vehicle 103 (e.g., vehicle type, vehicle year, vehicle manufacturer, vehicle model, etc.), the vehicle status data of the vehicle 103, the vehicle operation model of the vehicle 103 (e.g., acceleration/deceleration pattern, braking pattern, steering model, kinetic model, etc.), etc. As discussed elsewhere herein, the vehicle status data of the vehicle 103 may include the vehicle movement metrics describing the vehicle movement of the vehicle 103, the vehicle feature metrics describing the dynamic feature attributes of the vehicle 103, and the vehicle capacity metrics describing the user capacity and the luggage capacity of the vehicle 103. In some embodiments, in addition to the dynamic feature attributes of the vehicle 103, the vehicle profile of the vehicle 103 may also include the static feature attributes of the vehicle 103 (e.g., the seat type, the legroom size, the driver assistance features, the infotainment features, etc.). In some embodiments, the vehicle 103 and/or the MP server 105 of the MP 101 may periodically update the vehicle status data of the vehicle 103 in the MP data store 123 of the mobility platform 131 (e.g., every 2s).

In some embodiments, the platform data store 133 may store mobility utilization data, the mobility utilization data may describe the transportation capacity utilization in which a first MP 101 deploys a vehicle 103 in its vehicle fleet to execute the transportation request for the requesting MP 101. In some embodiments, for each transportation capacity utilization associated with the transportation request, the mobility utilization data may include the request ID and the request parameters of the transportation request, the MP ID of the requesting MP 101 that requests the transportation capacity, the vehicle movement requirements and the vehicle feature requirements of the transportation request, etc. The mobility utilization data may also include the MP ID of the first MP 101 that provides the transportation capacity, the vehicle ID of the first vehicle 103 of the first MP 101 that executes the transportation request, the mobility plan of the first vehicle 103 to execute the transportation request, the execution status of the transportation request, etc. Other types of mobility utilization data are also possible and contemplated.

In some embodiments, the platform data store 133 may store the roadway data describing various road segments. In some embodiments, the roadway data may include the number of lanes, the lane status (e.g., closed lane, open lane, etc.), the shape and length, the roadway structure, the roadway surface condition, etc., associated with each road segment. In some embodiments, the platform data store 133 may also store the traffic model describing the traffic condition on various road segments. In some embodiments, the traffic model may indicate the traffic flow rate, the vehicle density, the average vehicle speed, the average following distance, etc., associated with each road segment.

In some embodiments, the platform data store 133 may store a metric estimation model implemented by the mobility platform 131, the metric estimation model may be a machine learning logic to estimate the vehicle movement metrics of the vehicle 103 as the vehicle 103 travels along a travel route. In some embodiments, the platform data store 133 may store a vehicle selection model implemented by the mobility platform 131, the vehicle selection model may be a machine learning logic to select the vehicle 103 to execute the transportation request. In some embodiments, these machine learning logic may have one or more model parameters (e.g., coefficients, weight factors, etc.) that are used to perform their corresponding operations. In some embodiments, for a machine learning logic, the platform data store 133 may store the values of the model parameters associated with the machine learning logic, the feedback values that are back-propagated to adjust the model parameters of the machine learning logic, etc. In some embodiments, the metric estimation model and/or the vehicle selection model may be implemented in the form of Convolutional Neural Network, Linear Regression Model, Recurrent Neural Network, Generative Adversarial Network, etc. Other types of supervised and unsupervised learning algorithm are also possible and contemplated.

Other variations and/or combinations are also possible and contemplated. It should be understood that the system 100 illustrated in FIG. 1A is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2A:
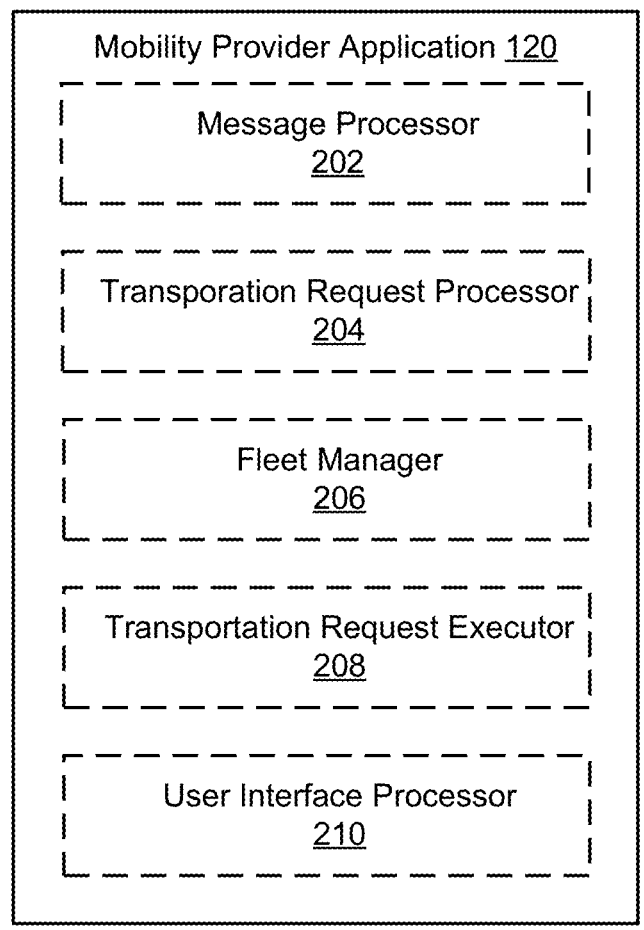
FIG. 2A is a block diagram of an example mobility provider application.

FIG. 2A is a block diagram of an example MP application 110. As depicted, the MP application 110 may include a message processor 202, a transportation request processor 204, a fleet manager 206, a transportation request executor 208, and a user interface processor 210, although it should be understood that the MP application 110 may include additional components such as, but not limited to, a configuration engine, a training engine, an encryption/decryption engine, etc., and/or these various components may be combined into a single engine or divided into additional engines. In some embodiments, the MP application 110 may be implemented in various computing entities of the MP 101 and may be configured based on the computing entity in which it is implemented. In some embodiments, the MP application 110 may be implemented in the user device 107, and optionally configured to enable the user interface processor 210 and disable other components of the MP application 110. In some embodiments, the MP application 110 may be implemented in the MP server 105, and optionally configured to enable the message processor 202, the transportation request processor 204, the fleet manager 206, and disable other components of the MP application 110. In some embodiments, the MP application 110 may be implemented in the vehicle 103, and optionally configured to enable the message processor 202, the transportation request executor 208, and disable other components of the MP application 110. Other configurations of the MP application 110 are also possible and contemplated.

The message processor 202, the transportation request processor 204, the fleet manager 206, the transportation request executor 208, and the user interface processor 210 may be implemented as software, hardware, or a combination of the foregoing. The message processor 202, the transportation request processor 204, the fleet manager 206, the transportation request executor 208, and the user interface processor 210 may be communicatively coupled by bus (e.g., the bus 154) and/or processor (e.g., the processor 115) to one another and/or the other components of the computing device of the computing entity (e.g., the computing device 152 of the vehicle 103). In some embodiments, one or more of the components 110, 202, 204, 206, 208, and/or 210 are sets of instructions executable by the processor (e.g., the processor 115) to provide their functionality. In further embodiments, one or more of the components 110, 202, 204, 206, 208, and/or 210 are storable in the memory (e.g., the memory 117) and are accessible and executable by the processor (e.g., the processor 115) to provide their functionality. In any of the foregoing embodiments, these components 110, 202, 204, 206, 208, and/or 210 may be adapted for cooperation and communication with the processor (e.g., the processor 115) and other components of the computing device of the computing entity (e.g., the computing device 152 of the vehicle 103). The MP application 110, and its components 202, 204, 206, 208, and/or 210 are described in further detail below with reference to at least FIGS. 3A-4B.

Figure 2B:
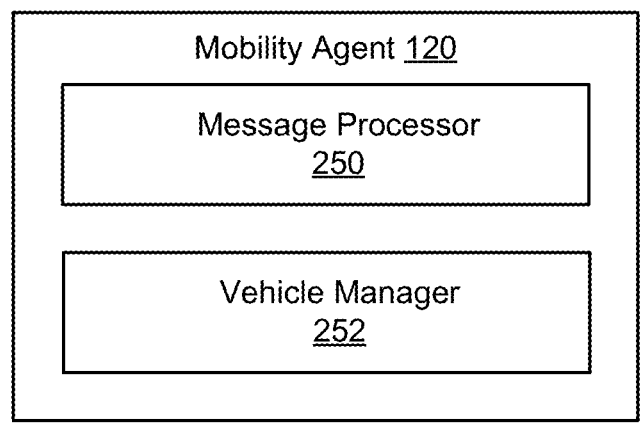
FIG. 2B is a block diagram of an example mobility agent
Figure 3D:
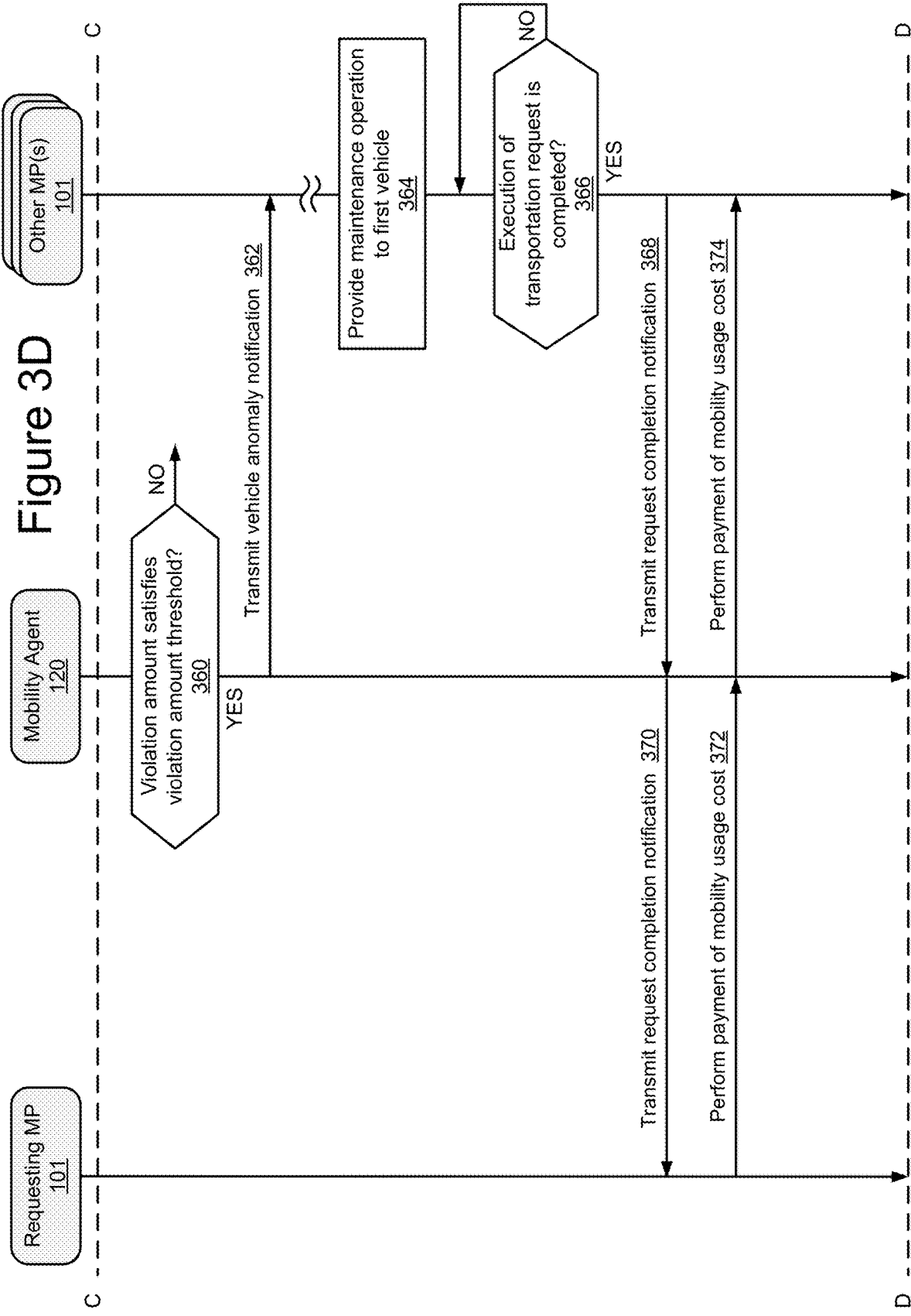

FIG. 2B is a block diagram of an example mobility agent 120. As depicted, the mobility agent 120 may include a message processor 250 and a vehicle manager 252, although it should be understood that the mobility agent 120 may include additional components such as, but not limited to, a configuration engine, a training engine, an encryption/decryption engine, etc., and/or these various components may be combined into a single engine or divided into additional engines. The message processor 250 and the vehicle manager 252 may be implemented as software, hardware, or a combination of the foregoing. The message processor 250 and the vehicle manager 252 may be communicatively coupled by bus and/or processor to one another and/or the other components of the computing device of the computing entity (e.g., the mobility platform 131). In some embodiments, one or more of the components 120, 250, and/or 252 are sets of instructions executable by the processor to provide their functionality. In further embodiments, one or more of the components 120, 250, and/or 252 are storable in the memory and are accessible and executable by the processor to provide their functionality. In any of the foregoing embodiments, these components 120, 250, and/or 252 may be adapted for cooperation and communication with the processor and other components of the computing device of the computing entity. The mobility agent 120, and its components 250 and/or 252 are described in further detail below with reference to at least FIGS. 3A-4B.

FIGS. 3A-3D illustrate a flowchart of an example method 300 for managing the vehicles 103 of the MPs 101. In some embodiments, the method 300 may be implemented by the mobility agent 120 to initiate and manage the utilization of a vehicle 103 belonging to a first MP 101 to execute a transportation request for a requesting MP 101. In block 302, the requesting MP 101 may receive a transportation request of a user of the requesting MP 101. In particular, in the MP server 105 of the requesting MP 101, the transportation request processor 204 may receive the transportation request initiated by the user of the requesting MP 101. The user may initiate the transportation request via the MP application 110*a* of the requesting MP 101 on the user device 107, and the transportation request may include the request parameters and the input parameters that the user provided as the user initiated the transportation request. The transportation request initiated by the user of the requesting MP 101 may be referred to herein as the transportation request of the requesting MP 101.

In block 304, the requesting MP 101 may process the transportation request. In particular, in the MP server 105 of the requesting MP 101, the transportation request processor 204 may analyze the transportation request, and extract the request parameters and the input parameters of the transportation request. As discussed elsewhere herein, the request parameters may specify the request information that is required to execute the transportation request (e.g., the request type, the number of vehicle users, the luggage space, the pick-up point, the pick-up time, the destination point), and the input parameters may specify other input information that the user additionally provided for the transportation request (e.g., the seat type, the interior temperature, the driver assistance feature, etc.). As an example, the transportation request processor 204 may determine that the user requested a shared ride for 2 passengers with 3 standard carry-on items. The 2 passengers need to be picked up at Salt Lake City airport on Nov. 5, 2018 at 14:00:00, and dropped off at University campus. The user also requested 2 heated seats and the interior temperature inside the vehicle to be higher than 24 □C.

In some embodiments, the transportation request processor 204 may determine the vehicle movement requirements and the vehicle feature requirements for the transportation request. If one or more of the vehicle movement requirements and/or the vehicle feature requirements are specified by the user, the transportation request processor 204 may determine these vehicle requirements based on the input parameters of the transportation request (e.g., seat type to be heated seat, interior temperature to be higher than 24 □C., etc.). If one or more of the vehicle movement requirements and/or the vehicle feature requirements are not specified by the user, the transportation request processor 204 may determine these vehicle requirements to be the default vehicle requirements specified in the operational protocol of the requesting MP 101 (e.g., waiting time to be less than 10 minutes, vehicle speed to be within the range of 55-120 km/h, vehicle acceleration/deceleration rate to be within the range of 4-6 m/s$^2$, etc.). The vehicle movement requirements and the vehicle feature requirements for the transportation request of the requesting MP 101 may be referred to herein as the vehicle movement requirements and the vehicle feature requirements of the requesting MP 101.

In block 306, the requesting MP 101 may determine whether the transportation request is executable by a vehicle 103 in its own vehicle fleet. In particular, in the MP server 105 of the requesting MP 101, the fleet manager 206 may analyze the vehicle data of the vehicles 103 in the vehicle fleet of the requesting MP 101, and determine the first vehicle 103 that can execute the transportation request. In some embodiments, the fleet manager 206 may determine a set of vehicles 103 in which each vehicle 103 may have the available user space and the available luggage space satisfying the request parameters, and have the static feature attributes (e.g., seat type, legroom size, driver assistance features, etc.) and the dynamic feature attributes (e.g., interior temperature, interior humidity level, etc.) satisfying the vehicle feature requirements of the transportation request. These vehicles 103 may also have the pick-up distance between their vehicle location and the pick-up point of the transportation request satisfying the pick-up distance threshold (e.g., less than 3 km).

In some embodiments, the fleet manager 206 may select the first vehicle 103 from set of vehicles 103. In some embodiments, for a vehicle 103 in the set of vehicles 103, the fleet manager 206 may compute a travel route for the vehicle 103 to travel from the pick-up point to the destination point of the transportation request using the route calculation model implemented by the requesting MP 101, and compute the estimated arrival time at which the vehicle 103 may arrive at the destination point. In some embodiments, the fleet manager 206 may analyze the vehicle route plan of the vehicle 103, and determine whether the vehicle 103 is available during the time window between the pick-up time of the transportation request and the estimated arrival time. If the vehicle 103 is available during the time window between the pick-up time of the transportation request and the estimated arrival time, the fleet manager 206 may determine the vehicle 103 to be the first vehicle 103 to execute the transportation request. In some embodiments, if multiple first vehicles 103 can execute the transportation request, the fleet manager 206 may select the first vehicle 103 that has the lowest pick-up distance from the pick-up point of the transportation request to execute the transportation request. As discussed above, the first vehicle 103 is included in the vehicle fleet of the requesting MP 101, and thus the first vehicle 103 may implement the computational models and/or the vehicle configurations that are specific to the requesting MP 101. As a result, the first vehicle 103 may execute the transportation request according to the operational protocol of the requesting MP 101, and therefore the vehicle movement metrics (e.g., vehicle speed, vehicle acceleration/deceleration rate, vehicle vibration metric, etc.) of the first vehicle 103 as the first vehicle 103 executes the transportation request may satisfy the vehicle movement requirements of the requesting MP 101.

If in block 306, the requesting MP 101 determines that the transportation request is executable by the first vehicle 103 of the requesting MP, the method 300 may proceed to block 308. In block 308, the requesting MP 101 may execute the transportation request using the first vehicle 103. In particular, in the MP server 105 of the requesting MP 101, the fleet manager 206 may determine the relocation route for the first vehicle 103 to relocate from the last stop point prior to the pick-up time in the vehicle route plan of the first vehicle 103 to the pick-up point of the transportation request. The fleet manager 206 may then update the vehicle route plan of the first vehicle 103 to include the pick-up point, the pick-up time, the destination point, the relocation route of the first vehicle 103, and the travel route of the first vehicle 103 from the pick-up point to the destination point of the transportation request. In the first vehicle 103 of the requesting MP 101, the transportation request executor 208 may execute the transportation request based on the updated vehicle route plan of the first vehicle 103.

Alternatively, in the MP server 105 of the requesting MP 101, the fleet manager 206 may update the vehicle route plan of the first vehicle 103 to include the pick-up point, the pick-up time, and the destination point of the transportation request. In the first vehicle 103 of the requesting MP 101, the transportation request executor 208 may determine the relocation route of the first vehicle 103 from the last stop point prior to the pick-up time in the vehicle route plan of the first vehicle 103 to the pick-up point of the transportation request, determine the travel route of the first vehicle 103 from the pick-up point to the destination point of the transportation request, and execute the transportation request based on the updated vehicle route plan of the first vehicle 103, the relocation route, and the travel route. In some embodiments, to execute the transportation request, the transportation request executor 208 may communicate the pick-up point, the pick-up time, the destination point, the relocation route, and the travel route to the vehicle controller 115, and the vehicle controller 115 may control the navigation system, actuators, motivators, etc., of the first vehicle 103 accordingly. As a result, the first vehicle 103 may arrive at the pick-up point approximately at the pick-up time, and then follow the travel route from the pick-up point to the destination point of the transportation request to carry out the transportation request.

If in block 306, the requesting MP 101 determines that the transportation request is not executable by any vehicle in the vehicle fleet of the requesting MP, the method 300 may proceed to block 310. In block 310, the requesting MP 101 may generate a mobility usage request requesting the utilization of a vehicle 103 belonging to another MP 101 to execute the transportation request, and transmit the mobility usage request to the mobility agent 120. In particular, in the MP server 105 of the requesting MP 101, the fleet manager 206 may generate the mobility usage request including the request ID and the request parameters of the transportation request. The mobility usage request may also include the vehicle movement requirements and the vehicle feature requirements of the requesting MP 101. The message processor 202 may then transmit the mobility usage request to the mobility agent 120 via the network 109.

In block 312, the mobility agent 120 may receive the mobility usage request from the MP server 105 of the requesting MP 101 via the network 109, and process the mobility usage request. In particular, in the mobility agent 120, the message processor 250 may analyze the mobility usage request, extract the request ID and the request parameters of the transportation request, and extract the vehicle movement requirements and the vehicle feature requirements of the requesting MP 101. As discussed elsewhere herein, the request parameters may specify the request information that is required to fulfill the transportation request (e.g., the request type, the number of vehicle users, the luggage space, the pick-up point, the pick-up time, the destination point). The vehicle movement requirements may specify the requirements that the vehicle movement of the vehicle 103 needs to satisfy as the vehicle 103 executes the transportation request (e.g., the waiting time, the traveling time, the vehicle speed, the acceleration/deceleration rate, the vehicle vibration metric, the interior noise level, etc.). The vehicle feature requirements may specify the requirements that the vehicle features of the vehicle 103 need to satisfy as the vehicle 103 executes the transportation request (e.g., the interior temperature, the interior humidity level, the seat type, the legroom size, the driving assistance features, the infotainment features, the food and beverage options, etc.). As discussed elsewhere herein, the vehicle movement requirements and the vehicle feature requirements may be determined based on the input parameters provided by the user of the requesting MP 101 as the user initiated the transportation request, and/or the default requirements specified in the operational protocol of the requesting MP 101.

In block 314, the mobility agent 120 may select one or more first vehicle profiles of one or more first MPs 101 based on the request parameters of the transportation request and the vehicle feature requirements of the requesting MP 101. In particular, in the mobility agent 120, the vehicle manager 252 may select the first vehicle profiles representing the first vehicles 103 of the first MPs 101 from a plurality of vehicle profiles of other MPs 101 in the platform data store 133, the other MPs 101 may be distinct from the requesting MP 101. In some embodiments, the vehicle manager 252 may analyze the vehicle profiles of the other MPs 101, and select the first vehicle profiles representing the first vehicles 103 that satisfy the requested capacity indicated by the request parameters and satisfy the vehicle feature requirements of the requesting MP 101. Thus, to be selected, the first vehicle 103 may have the available user space and the available luggage space satisfying the number of vehicle users and the luggage space of the transportation request. The first vehicle 103 may also have the static feature attributes (e.g., seat type, legroom size, driver assistance features, etc.) and the dynamic feature attributes (e.g., interior temperature, interior humidity level, etc.) satisfying the vehicle feature requirements of the requesting MP 101. In some embodiments, to be selected, the first vehicle 103 may also have the pick-up distance between the vehicle location of the first vehicle 103 and the pick-up point of the transportation request satisfying the pick-up distance threshold (e.g., less than 5 km) to avoid significant relocation of the first vehicle 103. In some embodiments, the vehicle manager 252 may rank the first vehicles 103 based on their pick-up distances, and select a predefined number of first vehicles 103 that have the lowest pick-up distance from the pick-up point of the transportation request (e.g., 10 vehicles).

Continuing the above example, the vehicle manager 252 may select the first vehicle profiles representing the first vehicles 103 of the first MPs 101, in which each first vehicle 103 may have at least 2 unoccupied heated seats and have the available luggage space sufficient to place at least 3 standard carry-on items. In this example, these first vehicles 103 may also have the interior temperature inside the vehicle higher than 24 □C.

In block 316, for each first vehicle 103 of the first MP 101, the mobility agent 120 may generate a request for executability associated with the first vehicle 103, and transmit the request for executability to the first MP 101. In particular, in the mobility agent 120, the vehicle manager 252 may generate the request for executability including the vehicle ID of the first vehicle 103, and the request ID and the request parameters of the transportation request. In some embodiments, the vehicle manager 252 may exclude the vehicle movement requirements and the vehicle feature requirements of the requesting MP 101 from the request for executability. This implementation is advantageous, because it avoids disclosing the vehicle movement requirements and the vehicle feature requirements of the requesting MP 101 to the first MPs 101, and thus these first MPs 101 may not be aware of the operational protocol of the requesting MP 101 and the input parameters provided by the user of the requesting MP 101 that are not required to execute the transportation request. The message processor 250 may then transmit the request for executability associated with the first vehicle 103 of the first MP 101 to the first MP 101.

In block 318, the first MP 101 may receive the request for executability associated with the first vehicle 103 of the first MP 101, and process the request for executability. In particular, in the MP server 105 of the first MP 101, the message processor 202 may analyze the request for executability, and extract the vehicle ID of the first vehicle 103, and the request ID and the request parameters of the transportation request. As discussed elsewhere herein, the request parameters may include the request type, the number of vehicle users, the luggage space, the pick-up point, the pick-up time, and the destination point of the transportation request.

In block 320, the first MP 101 may determine whether the transportation request is executable by the first vehicle 103 in its vehicle fleet. In particular, in the MP server 105 of the first MP 101, the fleet manager 206 may determine whether the first vehicle 103 can execute the transportation request based on the operational protocol of the first MP 101 and the vehicle route plan of the first vehicle 103. In some embodiments, the fleet manager 206 may reference the operational protocol of the first MP 101, and determine whether the request type of the transportation request (e.g., shared ride) is included in the request category of the first vehicle 103 (e.g., vehicle rental and package delivery). In some embodiments, the fleet manager 206 may determine a travel route for the first vehicle 103 to travel from the pick-up point to the destination point of the transportation request using the route calculation model implemented by the first MP 101, and compute the estimated arrival time at which the first vehicle 103 may arrive at the destination point if the first vehicle 103 executes the transportation request. The fleet manager 206 may then reference the vehicle route plan of the first vehicle 103, and determine whether the first vehicle 103 is available during the time window between the pick-up time of the transportation request and the estimated arrival time. In some embodiments, if the request type of the transportation request is included in the request category of the first vehicle 103 and the first vehicle 103 is available during the time window between the pick-up time of the transportation request and the estimated arrival time, the fleet manager 206 may determine that the first vehicle 103 can execute the transportation request. It should be understood that the first MP 101 may use other factors and/or other implementations to determine whether the transportation request is executable by the first vehicle 103.

If in block 320, the first MP 101 determines that the transportation request is not executable by the first vehicle 103, the method 300 may proceed to block 322. In block 322, the first MP 101 may generate a response of non-executablity associated with the first vehicle 103. In particular, in the MP server 105 of the first MP 101, the fleet manager 206 may generate the response of non-executablity including the request ID of the transportation request and the vehicle ID of the first vehicle 103, the response of non-executablity may indicate that the first vehicle 103 cannot execute the transportation request. In block 324, the message processor 202 may transmit the response of non-executablity associated with the first vehicle 103 to the mobility agent 120.

In some embodiments, the mobility agent 120 may receive the response of non-executablity associated with the first vehicle 103 from the first MP 101, and process the response of non-executablity. In particular, in the mobility agent 120, the message processor 250 may analyze the response of non-executablity, and extract the request ID and the vehicle ID of the first vehicle 103. As the first vehicle 103 cannot execute the transportation request, the vehicle manager 252 may disregard the first vehicle 103 from further consideration.

If in block 320, the first MP 101 determines that the transportation request is executable by the first vehicle 103, the method 300 may proceed to block 326. In block 326, the first MP 101 may generate a mobility plan for the first vehicle 103 to execute the transportation request. In particular, in the MP server 105 of the first MP 101, the fleet manager 206 may generate the mobility plan for the first vehicle 103 based on the request parameters of the transportation request and an operational protocol of the first MP 101. In some embodiments, to generate the mobility plan of the first vehicle 103, the fleet manager 206 may determine the travel route for the first vehicle 103 to travel from the pick-up point to the destination point of the transportation request using the route calculation model implemented by the first MP 101. Thus, due to the computational models (e.g., the route calculation model, etc.) and the vehicle configurations of the first MP 101 implemented in the MP server 105 and the first vehicle 103 of the first MP 101, the first vehicle 103 may execute the transportation request of the requesting MP 101 in a manner similar to executing other transportation requests of the first MP 101. In some embodiments, the travel route of the first vehicle 103 from the pick-up point to the destination point of the transportation request may be based on the vehicle route plan of the first vehicle 103. For example, the fleet manager 206 may determine the optimal travel route for the first vehicle 103 to travel from the pick-up point to the destination point of the transportation request based on the last stop point prior to the pick-up time in the vehicle route plan of the first vehicle 103.

In some embodiments, to generate the mobility plan for the first vehicle 103, the fleet manager 206 may also determine a relocation route for the first vehicle 103 to relocate from the last stop point prior to the pick-up time in the vehicle route plan of the first vehicle 103 to the pick-up point of the transportation request, and compute the estimated pick-up time at which the first vehicle 103 may arrive at the pick-up point. The fleet manager 206 may also compute the estimated arrival time at which the first vehicle 103 may arrive at the destination point based on the estimated pick-up time and the travel route of the first vehicle 103 from the pick-up point to the destination point of the transportation request. The fleet manager 206 may also compute the mobility usage cost for utilizing the first vehicle 103 of the first MP 101 to execute the transportation request of the requesting MP 101. For example, the mobility usage cost may be directly proportional to the total length of the relocation route and the travel route along which the first vehicle 103 may travel to carry out the transportation request.

In some embodiments, the fleet manager 206 may then generate the mobility plan for the first vehicle 103 to execute the transportation request, the mobility plan may include a plan ID uniquely identifying the mobility plan, the MP ID of the first MP 101, the vehicle ID of the first vehicle 103, the request ID of the transportation request, the travel route of the first vehicle 103 from the pick-up point to the destination point of the transportation request, the estimated pick-up time at which the first vehicle 103 may arrive at the pick-up point, the estimated arrival time at which the first vehicle 103 may arrive at the destination point, the mobility usage cost for utilizing the first vehicle 103 to execute the transportation request, etc. In block 328, the message processor 202 may transmit the mobility plan of the first vehicle 103 to the mobility agent 120.

In some embodiments, the mobility agent 120 may receive the mobility plan for the first vehicle 103 to execute the transportation request. As discussed above, the mobility agent 120 may receive the mobility plan of the first vehicle 103 from the MP server 105 of the first MP 101 to which the first vehicle 103 belongs. Thus, the mobility agent 120 may receive multiple mobility plans of multiple first vehicles 103 from the MP servers 105 of various first MPs 101, each first vehicle 103 may execute the transportation request according to its mobility plan if the first vehicle 103 is selected to execute the transportation request. In some embodiments, the mobility agent 120 may process the mobility plan of each first vehicle 103. In particular, in the mobility agent 120, the message processor 250 may analyze the mobility plan of each first vehicle 103, and extract the plan ID of the mobility plan, the MP ID of the first MP 101, the vehicle ID of the first vehicle 103, the request ID of the transportation request, the travel route of the first vehicle 103 from the pick-up point to the destination point of the transportation request, the estimated pick-up time at which the first vehicle 103 may arrive at the pick-up point, the estimated arrival time at which the first vehicle 103 may arrive at the destination point, the mobility usage cost for utilizing the first vehicle 103 to execute the transportation request, etc.

In block 330, for the mobility plan of each first vehicle 103, the mobility agent 120 may determine whether the first vehicle 103 is qualified to execute the transportation request using the vehicle movement requirements of the requesting MP 101 and the mobility plan of the first vehicle 103. In some embodiments, to determine whether the first vehicle 103 is qualified to execute the transportation request, the mobility agent 120 may compute one or more estimated vehicle movement metrics of the first vehicle 103 if the first vehicle 103 travels according to the mobility plan of the first vehicle 103.

In some embodiments, to compute the estimated vehicle movement metrics of the first vehicle 103 traveling according to the mobility plan of the first vehicle 103, the mobility agent 120 may simulate the vehicle movement of the first vehicle 103 along the travel route of the first vehicle 103 from the pick-up point to the destination point of the transportation request under various traffic conditions. In particular, in the mobility agent 120, the vehicle manager 252 may apply different values to the model parameters of the traffic model (e.g., the traffic flow rate, the vehicle density, the average vehicle speed, etc.) to illustrate various traffic conditions on the road segments that are included in the travel route of the first vehicle 103. For each traffic condition, the vehicle manager 252 may simulate the vehicle movement of the first vehicle 103 along these road segments under the traffic condition based on the traffic model, the roadway data of these road segments (e.g., roadway structure, lane status, roadway surface condition, etc.), the vehicle operation model of the first vehicle 103 (e.g., acceleration/deceleration pattern, braking pattern, kinetic model, etc.), etc. The vehicle manager 252 may then estimate the vehicle movement metrics of the first vehicle 103 traveling along these road segments under the traffic condition based on the simulated vehicle movement, and determine whether the estimated vehicle movement metrics of the first vehicle 103 satisfy the vehicle movement requirements of the requesting MP 101 (e.g., waiting time, traveling time, vehicle speed, vehicle vibration metric, etc.). For example, the vehicle manager 252 may determine whether the estimated vehicle movement metrics of the first vehicle 103 are within the value range or equal to the value of the vehicle movement metrics specified by the corresponding vehicle movement requirements of the requesting MP 101.

In some embodiments, if the estimated vehicle movement metrics of the first vehicle 103 traveling along the road segments of the travel route under various traffic conditions all satisfy the vehicle movement requirements of the requesting MP 101, the vehicle manager 252 may determine that the vehicle movement of the first vehicle 103 along the travel route from the pick-up point to the destination point of the transportation request according to the mobility plan of the first vehicle 103 satisfies the vehicle movement requirements of the requesting MP 101. Therefore, the vehicle manager 252 may determine that the first vehicle 103 is qualified to execute the transportation request for the requesting MP 101 according to the mobility plan of the first vehicle 103. In some embodiments, if one or more estimated vehicle movement metrics of the first vehicle 103 traveling along the road segments of the travel route under a traffic condition do not satisfy the vehicle movement requirements of the requesting MP 101, the vehicle manager 252 may determine that the vehicle movement of the first vehicle 103 along the travel route from the pick-up point to the destination point of the transportation request according to the mobility plan of the first vehicle 103 does not satisfy the vehicle movement requirements of the requesting MP 101. Therefore, the vehicle manager 252 may determine that the first vehicle 103 is not qualified to execute the transportation request for the requesting MP 101 according to the mobility plan of the first vehicle 103.

In some embodiments, to compute the estimated vehicle movement metrics of the first vehicle 103 traveling according to the mobility plan of the first vehicle 103, the mobility agent 120 may implement a metric estimation model. In particular, in the mobility agent 120, the vehicle manager 252 may implement the metric estimation model in the form of a machine learning logic that estimates the vehicle movement metrics of the first vehicle 103. An example metric estimation model implemented by the vehicle manager 252 is illustrated in FIG. 4A. As depicted, the metric estimation model may include a vehicle movement metric estimator 402 and a feedback calculator 404. As discussed elsewhere herein, the metric estimation model may include one or more model parameters that are used to perform its operations.

As depicted in FIG. 4A, the vehicle movement metric estimator 402 may compute the estimated vehicle movement metrics of the first vehicle 103 using various inputs. In some embodiments, the vehicle movement metric estimator 402 may compute the estimated vehicle movement metrics of the first vehicle 103 traveling along the travel route from the pick-up point to the destination point of the transportation request using the vehicle operation model of the first vehicle 103 (e.g., acceleration/deceleration pattern, braking pattern, kinetic model, etc.), the roadway data of the road segments included in the travel route (e.g., roadway structure, lane status, roadway surface condition, etc.), the traffic model describing the traffic condition on the road segments included in the travel route (e.g., the traffic flow rate, the vehicle density, the average vehicle speed, etc.), the time window between the estimated pick-up time and the estimated arrival time in the mobility plan of the first vehicle 103, etc. As discussed in details below, as the first vehicle 103 is selected to execute the transportation request, the vehicle manager 252 may monitor the execution of the transportation request by the first vehicle 103, and adjust the model parameters of the metric estimation model accordingly. As a result, the accuracy of the metric estimation model in computing the estimated vehicle movement metrics of the first vehicle 103 can be continuously improved.

In some embodiments, once the estimated vehicle movement metrics of the first vehicle 103 traveling according to the mobility plan of the first vehicle 103 are computed using the metric estimation model, the vehicle manager 252 may determine whether these estimated vehicle movement metrics of the first vehicle 103 satisfy the vehicle movement requirements of the requesting MP 101 (e.g., waiting time, traveling time, vehicle speed, vehicle vibration metric, etc.). If the estimated vehicle movement metrics of the first vehicle 103 satisfy the vehicle movement requirements of the requesting MP 101, the vehicle manager 252 may determine that the vehicle movement of the first vehicle 103 along the travel route from the pick-up point to the destination point of the transportation request according to the mobility plan of the first vehicle 103 satisfies the vehicle movement requirements of the requesting MP 101. Therefore, the vehicle manager 252 may determine that the first vehicle 103 is qualified to execute the transportation request for the requesting MP 101 according to the mobility plan of the first vehicle 103. In some embodiments, if one or more estimated vehicle movement metrics of the first vehicle 103 do not satisfy the vehicle movement requirements of the requesting MP 101, the vehicle manager 252 may determine that the vehicle movement of the first vehicle 103 along the travel route from the pick-up point to the destination point of the transportation request according to the mobility plan of the first vehicle 103 does not satisfy the vehicle movement requirements of the requesting MP 101. Therefore, the vehicle manager 252 may determine that the first vehicle 103 is not qualified to execute the transportation request for the requesting MP 101 according to the mobility plan of the first vehicle 103.

In some embodiments, to determine whether the first vehicle 103 is qualified to execute the transportation request according to the mobility plan of the first vehicle 103, the mobility agent 120 may implement a vehicle selection model. In particular, in the mobility agent 120, the vehicle manager 252 may implement the vehicle selection model in the form of a machine learning logic that determines whether the first vehicle 103 is qualified to execute the transportation request given the mobility plan of the first vehicle 103 and the vehicle movement requirements of the requesting MP 101. An example vehicle selection model implemented by the vehicle manager 252 is illustrated in FIG. 4B. As depicted, the vehicle selection model may include a vehicle selector 452 and a feedback calculator 454. As discussed elsewhere herein, the vehicle selection model may include one or more model parameters that are used to perform its operations.

As depicted in FIG. 4B, the vehicle selector 452 may determine whether the first vehicle 103 is qualified to execute the transportation request according to the mobility plan of the first vehicle 103 using various inputs. In some embodiments, the vehicle selector 452 may determine whether the first vehicle 103 is qualified to execute the transportation request using the vehicle category data of the first vehicle 103 (e.g., vehicle type, vehicle year, vehicle manufacturer, vehicle model, etc.), the vehicle operation model of the first vehicle 103 (e.g., acceleration/deceleration pattern, braking pattern, kinetic model, etc.), the mobility plan of the first vehicle 103 (e.g., the travel route from the pick-up point to the destination point of the transportation request, the estimated pick-up time, the estimated arrival time, etc.), the vehicle movement requirements of the requesting MP 101 (e.g., waiting time, traveling time, vehicle speed, vehicle vibration metric, etc.), etc. Thus, the vehicle selector 452 may evaluate the qualification of the first vehicle 103 to execute the transportation request based on the vehicle movement requirements of the requesting MP 101, given the vehicle characteristics and the mobility plan of the first vehicle 103. As discussed in details below, as the first vehicle 103 is selected to execute the transportation request, the vehicle manager 252 may monitor the execution of the transportation request by the first vehicle 103, and adjust the model parameters of the vehicle selection model accordingly. As a result, the accuracy of the vehicle selection model in determining whether the first vehicle 103 is qualified to execute the transportation request according to the mobility plan of the first vehicle 103 can be continuously improved.

Referring back to the method 300 in FIG. 3B, if in block 330, the mobility agent 120 determines that the first vehicle 103 is qualified to execute the transportation request given the mobility plan of the first vehicle 103 and the vehicle movement requirements of the requesting MP 101, the method 300 may proceed to block 332. In block 332, the mobility agent 120 may update a list of mobility plans associated with the transportation request. In particular, in the mobility agent 120, the vehicle manager 252 may update the list of mobility plans to include the mobility plan of the first vehicle 103. If in block 330, the mobility agent 120 determines that the first vehicle 103 is not qualified to execute the transportation request given the mobility plan of the first vehicle 103 and the vehicle movement requirements of the requesting MP 101, the mobility agent 120 may disregard the first vehicle 103 from further consideration. In particular, in the mobility agent 120, the vehicle manager 252 may not include the mobility plan of the first vehicle 103 in the list of mobility plans.

In some embodiments, the list of mobility plans associated with the transportation request may include one or more mobility plans of one or more first vehicles 103 that are qualified to execute the transportation request of the requesting MP 101. Thus, in order for the mobility plan of the first vehicle 103 to be included in the list of mobility plans, the first vehicle 103 of the first MP 101 may have the available user space and the available luggage space satisfying the number of vehicle users and the luggage space of the transportation request, and have the static feature attributes and the dynamic feature attributes satisfying the vehicle feature requirements of the requesting MP 101 as discussed above with reference to block 314. The first vehicle 103 of the first MP 101 may also have the vehicle movement of the first vehicle 103 traveling according to the mobility plan of the first vehicle 103 satisfying the vehicle movement requirements of the requesting MP 101 as discussed above with reference to block 330. As these determinations are performed by the mobility agent 120, this implementation can identify the first vehicle 103 of the first MP 101 that is qualified to execute the transportation request of the requesting MP 101 without disclosing the vehicle feature requirements and the vehicle movement requirements of the requesting MP 101 to the first MP 101, and without disclosing the vehicle status data (e.g., vehicle movement metrics, vehicle feature metrics, vehicle capacity metrics, etc.) and the vehicle operation model of the first vehicle 103 belonging to the first MP 101 to the requesting MP 101.

In some embodiments, once the list of mobility plans associated with the transportation request is determined, in block 334, the mobility agent 120 may provide the list of mobility plans to the requesting MP 101. In particular, in the mobility agent 120, the message processor 250 may transmit the list of mobility plans to the MP server 105 of the requesting MP 101 via the network 109. As discussed above, the list of mobility plans may include the mobility plans of the first vehicles 103 that are qualified to execute the transportation request of the requesting MP 101. In some embodiments, in the list of mobility plans transmitted to the requesting MP 101, the mobility plan of each first vehicle 103 may include the request ID of the transportation request, the plan ID of the mobility plan, the travel route that the first vehicle 103 may follow to travel from the pick-up point to the destination point of the transportation request, the estimated pick-up time at which the first vehicle 103 may arrive at the pick-up point, the estimated arrival time at which the first vehicle 103 may arrive at the destination point, the mobility usage cost for utilizing the first vehicle 103 to execute the transportation request, etc. The mobility plan of each first vehicle 103 may also optionally include the MP ID of the first MP 101 to which the first vehicle 103 belongs, the vehicle ID of the first vehicle 103, the vehicle category data of the first vehicle 103 (e.g., vehicle type, vehicle year, vehicle manufacturer, vehicle model, etc.), etc.

In some embodiments, the requesting MP 101 may receive the list of mobility plans associated with the transportation request from the mobility agent 120, and process the list of mobility plans. In particular, in the MP server 105 of the requesting MP 101, the message processor 202 may analyze the list of mobility plans and extract the mobility plan of each first vehicle 103. In block 336, the requesting MP 101 may select a mobility plan of a first vehicle 103 in the list of mobility plans to execute the transportation request. In particular, in the MP server 105 of the requesting MP 101, the fleet manager 206 may select the mobility plan of the first vehicle 103 based on one or more of the travel route, the estimated pick-up time, the estimated arrival time, the mobility usage cost, etc., included in the mobility plan. For example, the fleet manager 206 may select the mobility plan of the first vehicle 103 that has the shortest travel route, earliest estimated pick-up time, earliest estimated arrival time, and/or lowest mobility usage cost to execute the transportation request. Alternatively, the user interface processor 210 may render the mobility plans of the first vehicles 103 in the list of mobility plans to the user of the requesting MP 101 that initiated the transportation request. For example, the user interface processor 210 may render the mobility plans of the first vehicles 103 to the user via the MP application 110a of the requesting MP 101 on the user device 107, and receive the selection of the mobility plan to execute the transportation request from the user via the MP application 110a of the requesting MP 101 on the user device 107.

In some embodiments, the requesting MP 101 may generate a mobility plan selection associated with the transportation request. In particular, in the MP server 105 of the requesting MP 101, the fleet manager 206 may generate the mobility plan selection including the request ID of the transportation request, and the plan ID identifying the mobility plan of the first vehicle 103 that is selected to execute the transportation request. In block 338, the message processor 202 may transmit the mobility plan selection associated with the transportation request to the mobility agent 120 via the network 109.

In some embodiments, the mobility agent 120 may receive the mobility plan selection associated with the transportation request from the MP server 105 of the requesting MP 101, and process the mobility plan selection. In particular, in the mobility agent 120, the message processor 250 may analyze the mobility plan selection, and extract the request ID of the transportation request and the plan ID of the mobility plan selected to execute the transportation request. In some embodiments, the vehicle manager 252 may then generate a vehicle reservation request based on the selected mobility plan. In some embodiments, the vehicle manager 252 may determine the first vehicle 103 and the first MP 101 associated with the selected mobility plan, and generate the vehicle reservation request to reserve the first vehicle 103 of the first MP 101 to execute the transportation request. The vehicle reservation request may include the request ID of the transportation request, the vehicle ID of the first vehicle 103, and the plan ID of the mobility plan of the first vehicle 103 that is selected to execute the transportation request. In block 340, the message processor 250 may transmit the vehicle reservation request to the first MP 101.

In some embodiments, the first MP 101 may receive the vehicle reservation request from the mobility agent 120, and process the vehicle reservation request. In particular, in the MP server 105 of the first MP 101, the message processor 202 may analyze the vehicle reservation request, and extract the request ID of the transportation request, the vehicle ID of the first vehicle 103, and the plan ID of the mobility plan of the first vehicle 103. As discussed above, the vehicle reservation request may reserve the first vehicle 103 of the first MP 101 to execute the transportation request according to the mobility plan of the first vehicle 103.

In block 342, in order for the first vehicle 103 to execute the transportation request, the first MP 101 may update the vehicle route plan of the first vehicle 103 based on the mobility plan of the first vehicle 103. In particular, in the MP server 105 of the first MP 101, the fleet manager 206 may update the vehicle route plan of the first vehicle 103 to include the pick-up point and the destination point of the transportation request, the relocation route for the first vehicle 103 to relocate from the last stop point prior to the pick-up time in the vehicle route plan of the first vehicle 103 to the pick-up point of the transportation request, the travel route for the first vehicle 103 to travel from the pick-up point to the destination point of the transportation request. In some embodiments, the fleet manager 206 may also update the vehicle route plan of the first vehicle 103 to indicate the estimated pick-up time at which the first vehicle 103 may arrive at the pick-up point of the transportation request, and the estimated arrival time at which the first vehicle 103 may arrive at the destination point of the transportation request, etc. In some embodiments, the fleet manager 206 may transmit the updated vehicle route plan of the first vehicle 103 to the first vehicle 103. Thus, the first vehicle 103 may rely on the updated vehicle route plan of the first vehicle 103 to execute the transportation request according the mobility plan of the first vehicle 103.

In some embodiments, to execute the transportation request, the first vehicle 103 may follow the relocation route to relocate from the last stop point prior to the pick-up time in the vehicle route plan of the first vehicle 103 to the pick-up point of the transportation request. As the first vehicle 103 reaches the pick-up point of the transportation request, the first MP 101 may generate an execution start notification associated with the transportation request. In particular, in the first vehicle 103 of the first MP 101, the message processor 202 may generate the execution start notification indicating that the execution of the transportation request according to the mobility plan of the first vehicle 103 is started. The execution start notification may include the request ID of the transportation request, the vehicle ID of the first vehicle 103, and the plan ID of the mobility plan based on which the first vehicle 103 is executing the transportation request. In block 344, the message processor 202 may transmit the execution start notification to the mobility agent 120. The message processor 202 may also transmit the execution start notification to the MP server 105 of the first MP 101.

In block 346, as the execution of the transportation request is started, the first MP 101 may execute the transportation request of the requesting MP 101 by the first vehicle 103 according to the mobility plan of the first vehicle 103. In particular, in the first vehicle 103 of the first MP 101, the transportation request executor 208 may communicate the travel route and the destination point of the transportation request to the vehicle controller 115, and the vehicle controller 115 may control the navigation system, actuators, motivators, etc., of the first vehicle 103 accordingly. As a result, the first vehicle 103 may follow the travel route to travel from the pick-up point to the destination point of the transportation request, thereby executing the transportation request of the requesting MP 101. Continuing the above example, to provide the shared ride that the user of the requesting MP 101 requested in the transportation request, the first vehicle 103 of the first MP 101 may arrive at Salt Lake City airport to pick up the 2 passengers with 3 standard carry-on items. The first vehicle 103 may then follow the travel route in the mobility plan of the first vehicle 103 to travel from Salt Lake City airport to University campus to drop off the 2 passengers and their luggage items at University campus.

In some embodiments, the mobility agent 120 may receive the execution start notification associated with the transportation request from the first MP 101, and process the execution start notification. In particular, in the mobility agent 120, the message processor 250 may analyze the execution start notification, and extract the request ID of the transportation request, the vehicle ID of the first vehicle 103, and the plan ID of the mobility plan based on which the first vehicle 103 is executing the transportation request. As discussed above, the execution start notification may indicate that the execution of the transportation request by the first vehicle 103 of the first MP 101 according to the mobility plan of the first vehicle 103 is started.

In block 348, the mobility agent 120 may monitor the vehicle movement metrics and/or the vehicle feature metrics of the first vehicle 103 during the execution of the transportation request by the first vehicle 103. In particular, in the mobility agent 120, the vehicle manager 252 may continuously monitor the vehicle status data of the first vehicle 103 as the first vehicle 103 executes the transportation request according to its mobility plan. As discussed elsewhere herein, the vehicle status data of the first vehicle 103 may include the vehicle movement metrics describing the vehicle movement of the first vehicle 103 (e.g., vehicle location, vehicle speed, vehicle acceleration/deceleration rate, vehicle vibration metric, interior noise level, etc.), and the vehicle feature metrics describing the dynamic feature attributes of the first vehicle 103 (e.g., interior temperature, interior humidity level, etc.). The vehicle status data of the first vehicle 103 may be stored in the platform data store 133 of the mobility agent 120 and may be periodically updated by the first vehicle 103 (e.g., every 2s).

In block 350, the mobility agent 120 may adjust the model parameters of metric estimation model and/or the vehicle selection model based on the vehicle movement metrics of the first vehicle 103 as the first vehicle 103 is executing the transportation request. In particular, in the mobility agent 120, the vehicle manager 252 may adjust the model parameters of the metric estimation model and/or the vehicle selection model implemented by the vehicle manager 252.

As discussed above with reference to block 330, the vehicle manager 252 may implement the metric estimation model to compute the estimated vehicle movement metrics of the first vehicle 103 traveling along the travel route from the pick-up point to the destination point of the transportation request, and determine whether the first vehicle 103 is qualified to execute the transportation request based on these estimated vehicle movement metrics of the first vehicle 103. As discussed above with reference to block 348, the vehicle manager 252 may monitor the vehicle movement metrics of the first vehicle 103 as the first vehicle 103 travels along the travel route from the pick-up point to the destination point of the transportation request to execute the transportation request. Thus, as depicted in FIG. 4A in which the metric estimation model is implemented in the vehicle manager 252, the feedback calculator 404 of the metric estimation model may compute a feedback value based on the estimated vehicle movement metrics of the first vehicle 103 and the vehicle movement metrics of the first vehicle 103. For example, the feedback value may indicate the difference between the estimated vehicle movement metric and the corresponding vehicle movement metric of the first vehicle 103.

In some embodiments, the vehicle manager 252 may adjust the model parameters of the metric estimation model based on the feedback value. For example, the vehicle manager 252 may back-propagate the feedback value to the vehicle movement metric estimator 402, and adjust the model parameters being used by the vehicle movement metric estimator 402 to compute the estimated vehicle movement metrics of the first vehicle 103 based on the feedback value. Thus, as the feedback value indicating the difference between the estimated vehicle movement metric and the vehicle movement metric of the first vehicle 103 may be used to adjust the model parameters of the metric estimation model, the accuracy of the metric estimation model in computing the estimated vehicle movement metrics of the first vehicle 103 can be continuously improved. As a result, the vehicle manager 252 can accurately determine the first vehicle 103 that is qualified to execute the transportation request based on the estimated vehicle movement metrics of the first vehicle 103 computed using this metric estimation model.

As discussed above with reference to block 330, the vehicle manager 252 may implement the vehicle selection model to determine whether the first vehicle 103 is qualified to execute the transportation request based on the vehicle characteristics of the first vehicle 103 (e.g., vehicle category data, vehicle operation model, etc.), the mobility plan of the first vehicle 103 (e.g., travel route, estimated pick-up time, estimated arrival time, etc.), and the vehicle movement requirements of the requesting MP 101 (e.g., waiting time, traveling time, vehicle speed, vehicle vibration metric, etc.). As discussed above with reference to block 348, the vehicle manager 252 may monitor the vehicle movement metrics of the first vehicle 103 as the first vehicle 103 executes the transportation request of the requesting MP 101. Thus, as depicted in FIG. 4B in which the vehicle selection model is implemented in the vehicle manager 252, the feedback calculator 454 of the vehicle selection model may compute the feedback value based on the vehicle movement metrics of the first vehicle 103 and the vehicle movement requirements of the requesting MP 101. For example, the feedback value may indicate the difference between the vehicle movement metric of the first vehicle 103 and the corresponding vehicle movement requirement of the requesting MP 101.

In some embodiments, the vehicle manager 252 may adjust the model parameters of the vehicle selection model based on the feedback value. For example, the vehicle manager 252 may back-propagate the feedback value to the vehicle selector 452, and adjust the model parameters being used by the vehicle selector 452 to determine whether the first vehicle 103 is qualified to execute the transportation request based on the feedback value. Thus, as the feedback value indicating the difference between the vehicle movement metric of the first vehicle 103 and the vehicle movement requirement of the requesting MP 101 that the vehicle movement metric of the first vehicle 103 needs to satisfy may be used to adjust the model parameters of the vehicle selection model, the accuracy of the vehicle selection model in determining whether the first vehicle 103 is qualified to execute the transportation request given the vehicle characteristics of the first vehicle 103, the mobility plan of the first vehicle 103, and the vehicle movement requirements of the requesting MP 101 can be continuously improved. As a result, the vehicle manager 252 can accurately determine the first vehicle 103 that is qualified to execute the transportation request using this vehicle selection model.

In some embodiments, the mobility agent 120 may detect the violation of the vehicle movement requirements and/or the vehicle feature requirements of the requesting MP 101 during the execution of the transportation request by the first vehicle 103 of the first MP 101. Referring back to the method 300 in FIG. 3C, in block 352, the mobility agent 120 may determine whether a vehicle movement metric of the first vehicle 103 as the first vehicle 103 executes the transportation request of the requesting MP 101 violates the corresponding vehicle movement requirement of the requesting MP 101. In particular, in the mobility agent 120, the vehicle manager 252 may determine whether the vehicle movement metric of the first vehicle 103 is outside the value range or unequal to the value of the vehicle movement metric specified by the corresponding vehicle movement requirement of the requesting MP 101. If the vehicle movement metric of the first vehicle 103 is outside the value range or unequal to the value of the vehicle movement metric specified by the corresponding vehicle movement requirement of the requesting MP 101, the vehicle manager 252 may determine that the vehicle movement metric of the first vehicle 103 violates the corresponding vehicle movement requirement of the requesting MP 101. In some embodiments, the vehicle manager 252 may also determine whether a vehicle feature metric of the first vehicle 103 as the first vehicle 103 executes the transportation request of the requesting MP 101 violates the corresponding vehicle feature requirement of the requesting MP 101 in a similar manner.

In some embodiments, if no vehicle movement metric of the first vehicle 103 violates the corresponding vehicle movement requirement of the requesting MP 101 and no vehicle feature metric of the first vehicle 103 violates the corresponding vehicle feature requirement of the requesting MP 101, the method 300 may proceed to block 348. In block 348, the mobility agent 120 may continue monitoring the vehicle movement metrics and the vehicle feature metrics of the first vehicle 103 during the execution of the transportation request by the first vehicle 103.

In some embodiments, if the vehicle movement metric of the first vehicle 103 as the first vehicle 103 executes the transportation request of the requesting MP 101 violates the corresponding vehicle movement requirement the requesting MP 101, the method 300 may proceed to block 354. In block 354, the mobility agent 120 may compute the violation amount associated with the vehicle movement metric. In particular, in the mobility agent 120, the vehicle manager 252 may compute the violation amount associated with the vehicle movement metric based on the vehicle movement metric of the first vehicle 103 and the corresponding vehicle movement requirement the requesting MP 101. In some embodiments, if the corresponding vehicle movement requirement the requesting MP 101 specifies a value for vehicle movement metric, the vehicle manager 252 may compute the violation amount to be the difference between the vehicle movement metric of the first vehicle 103 and the value of the vehicle movement metric specified by the corresponding vehicle movement requirement the requesting MP 101. In some embodiments, if the corresponding vehicle movement requirement the requesting MP 101 specifies a value range for vehicle movement metric, the vehicle manager 252 may compute the first difference and the second difference between the vehicle movement metric of the first vehicle 103 and the upper limit and the lower limit of the value range, and determine the violation amount to be the lower difference among the first difference and the second difference. Similarly, if the vehicle feature metric of the first vehicle 103 as the first vehicle 103 executes the transportation request of the requesting MP 101 violates the corresponding vehicle feature requirement of the requesting MP 101, the vehicle manager 252 may compute the violation amount associated with the vehicle feature metric in a similar manner.

In block 356, the mobility agent 120 may generate a violation notification associated with the transportation request, and transmit the violation notification to the requesting MP 101. In particular, in the mobility agent 120, the vehicle manager 252 may generate the violation notification including the request ID of the transportation request, and the plan ID of the mobility plan based on which the transportation request is executed. If the vehicle movement metric of the first vehicle 103 violates the corresponding vehicle movement requirement of the requesting MP 101, the violation notification may include the vehicle movement requirement of the requesting MP 101 and the violation amount associated with the vehicle movement metric. If the vehicle feature metric of the first vehicle 103 violates the corresponding vehicle feature requirement of the requesting MP 101, the violation notification may include the vehicle feature requirement of the requesting MP 101 and the violation amount associated with the vehicle feature metric. The message processor 250 may then transmit the violation notification associated with the first vehicle 103 to the requesting MP 101. Thus, the violation notification may notify the requesting MP 101 about a violation of the vehicle movement requirement and/or the vehicle feature requirement of the requesting MP 101 as the first vehicle 103 of the first MP 101 executes the transportation request of the requesting MP 101.

As discussed above with reference to blocks 348 and 352, the vehicle movement metrics and the vehicle feature metrics of the first vehicle 103 of the first MP 101 may be monitored by the mobility agent 120 to detect the violation of the vehicle movement requirements and/or the vehicle feature requirements of the requesting MP 101 during the execution of the transportation request by the first vehicle 103 of the first MP 101. This implementation is advantageous, because it can notify the requesting MP 101 of these requirement violations without disclosing the vehicle metrics and/or other vehicle status data of the first vehicle 103 of the first MP 101 to the requesting MP 101.

Continuing the above example, the mobility agent 120 may determine that the first vehicle 103 of the first MP 101 has the vehicle speed of 125 km/h and the interior temperature of 16 □C. during the execution of the transportation request. In this example, the mobility agent 120 may generate the violation notification indicating that the vehicle movement requirement of the requesting MP 101 specifies the vehicle speed to be within the range of 55-120 km/h, and the violation amount of the vehicle speed of the first vehicle 103 is 5 km/h. The violation notification may also indicate that the vehicle feature requirement of the requesting MP 101 specifies the interior temperature to be higher than 24

☐C., and the violation amount of the interior temperature of the first vehicle 103 is 8 ☐C.

In some embodiments, the requesting MP 101 may receive the violation notification associated with the transportation request from the mobility agent 120, and process the violation notification. In particular, in the MP server 105 of the requesting MP 101, the message processor 202 may analyze the violation notification, and extract the request ID of the transportation request, the plan ID of the mobility plan based on which the transportation request is executed, the vehicle movement requirement and/or the vehicle feature requirement of the requesting MP 101 being violated, and the violation amount associated with the corresponding vehicle movement metric and/or the vehicle feature metric of the first vehicle 103.

In block 358, the requesting MP 101 may perform a corrective operation based on the violation amount associated with the vehicle movement metric and/or the vehicle feature metric of the first vehicle 103. For example, in the MP server 105 of the requesting MP 101, the fleet manager 206 may adjust the travel cost associated with the transportation request based on the violation amount. In some embodiments, the travel cost associated with the transportation request may be the cost that the user is charged for the transportation request, and the adjustment amount applied to the travel cost may be directly proportional to the violation amount associated with the vehicle metric of the first vehicle 103. In some embodiments, the user interface processor 210 may render the violation amount associated with the vehicle metrics of the first vehicle 103 and the adjusted travel cost of the transportation request to the user via the MP application 110a of the requesting MP 101 on the user device 107. Thus, if the requirement violation occurs during the execution of the transportation request by the first vehicle 103 of the first MP 101, the requesting MP 101 can adjust the travel cost of the transportation request accordingly, thereby maintaining a preferable user experience of the user with the requesting MP 101. Other types of corrective operation are also possible and contemplated.

In block 360, the mobility agent 120 may determine whether the violation amount associated with the vehicle movement metric and/or the vehicle feature metric of the first vehicle 103 satisfies a violation amount threshold. For example, in the mobility agent 120, the vehicle manager 252 may compare the violation amount associated with the vehicle metric of the first vehicle 103 to the corresponding violation amount threshold. The violation amount threshold may be based on the average value of the vehicle metric for multiple vehicles 103 that have the same vehicle category data as the first vehicle 103 and operate in good condition. In some embodiments, if the violation amount associated with the vehicle movement metric and/or the vehicle feature metric of the first vehicle 103 satisfies the corresponding violation amount threshold, the vehicle manager 252 may generate a vehicle anomaly notification associated with the first vehicle 103, the vehicle anomaly notification may indicate that the first vehicle 103 is anomalous. In some embodiments, the vehicle anomaly notification may include the vehicle ID of the first vehicle 103, the vehicle movement metric and/or the vehicle feature metric of the first vehicle 103 that satisfies the violation amount threshold, and the violation amount associated with the vehicle movement metric and/or the vehicle feature metric of the first vehicle 103. In block 362, the message processor 250 may transmit the vehicle anomaly notification associated with the first vehicle 103 to the first MP 101 to which the first vehicle 103 belongs.

Continuing the above example, the mobility agent 120 may determine that the violation amount associated with the interior temperature of the first vehicle 103 (e.g., 8 ☐C.) satisfies the corresponding violation amount threshold (e.g., more than 3☐C), and thus determine that the first vehicle 103 is anomalous. In this example, the mobility agent 120 may generate the vehicle anomaly notification indicating that interior temperature of the first vehicle 103 is 16 ☐C. and the violation amount associated with the interior temperature of the first vehicle 103 is 8 ☐C.

In some embodiments, the first MP 101 may receive the vehicle anomaly notification associated with the first vehicle 103, and process the vehicle anomaly notification. In particular, in the MP server 105 of the first MP 101, the message processor 202 may analyze the vehicle anomaly notification, and extract vehicle ID of the first vehicle 103, the vehicle metric of the first vehicle 103, and the violation amount associated with the vehicle metric of the first vehicle 103. As discussed above, the vehicle anomaly notification may indicate that the first vehicle 103 of the first MP 101 is anomalous. In block 364, the first MP 101 may provide a maintenance operation to the first vehicle 103. For example, in the MP server 105 of the first MP 101, the fleet manager 206 may update a vehicle maintenance list to include the vehicle ID, the vehicle metric, and the violation amount associated with the vehicle metric of the first vehicle 103, schedule a repair session for a maintenance worker to repair related units of the first vehicle 103 corresponding to the vehicle metric (e.g., air conditioning system), etc. Other types of maintenance operation are also possible and contemplated.

In block 366, the first MP 101 may determine whether the execution of the transportation request by the first vehicle 103 is completed. In particular, in the MP server 105 of the first MP 101, the fleet manager 206 may monitor the vehicle location of the first vehicle 103, and determine whether the first vehicle 103 has reached the destination point of the transportation request. If the first vehicle 103 has reached the destination point of the transportation request, the fleet manager 206 may determine that the execution of the transportation request by the first vehicle 103 is completed. If the first vehicle 103 has not reached the destination point of the transportation request, the fleet manager 206 may continue monitoring the vehicle location of the first vehicle 103 to detect the completion of the transportation request.

In block 368, once the execution of the transportation request by the first vehicle 103 of the first MP 101 is completed, the first MP 101 may generate a request completion notification associated with the transportation request, and transmit the request completion notification to the mobility agent 120. In particular, in the MP server 105 of the first MP 101, the fleet manager 206 may generate the request completion notification including the request ID of the transportation request, the vehicle ID of the first vehicle 103, the plan ID of the mobility plan based on which the first vehicle 103 executed the transportation request. The request completion notification may indicate that the execution of the transportation request by the first vehicle 103 according to the mobility plan of the first vehicle 103 is completed. The message processor 202 may then transmit the request completion notification to the mobility agent 120.

In some embodiments, the mobility agent 120 may receive the request completion notification associated with the transportation request from the first MP 101, and process the request completion notification. In particular, in the mobility agent 120, the message processor 250 may analyze the request completion notification, and extract the request ID of the transportation request, the vehicle ID of the first vehicle 103, and the plan ID of the mobility plan of the first vehicle 103. As discussed above, the request completion notification may indicate that the execution of the transportation request by the first vehicle 103 of the first MP 101 is completed. Therefore, the vehicle manager 252 may stop detecting the requirement violations based on the vehicle movement metrics and the vehicle feature metrics of the first vehicle 103. In some embodiments, the vehicle manager 252 may update the request completion notification to exclude the vehicle ID of the first vehicle 103, and include the mobility usage cost for utilizing the first vehicle 103 to execute the transportation request in the request completion notification. In block 370, the message processor 250 may then transmit the request completion notification associated with the transportation request to the requesting MP 101.

In some embodiments, the requesting MP 101 may receive the request completion notification associated with the transportation request from the mobility agent 120, and process the request completion notification. In particular, in the MP server 105 of the requesting MP 101, the message processor 202 may analyze the request completion notification, and extract the request ID of the transportation request, the plan ID of the mobility plan based on which the transportation request was executed, and the mobility usage cost associated with the mobility plan. In block 372, the fleet manager 206 may perform a payment of the mobility usage cost associated with the mobility plan to the mobility agent 120. Once the mobility agent 120 receives the payment of the mobility usage cost, the mobility agent 120 may perform a payment of the mobility usage cost to the first MP 101.

Thus, as discussed above, the mobility agent 120 may communicate with the requesting MP 101 and the first MPs 101 to determine the first vehicles 103 of the first MPs 101 that are qualified to execute the transportation request of the requesting MP 101, coordinate the selection and reservation of the first vehicle 103 of the first MP 101 to execute the transportation request, monitor the first vehicle 103 during the execution of the transportation request by the first vehicle 103 to detect and report requirement violations to the requesting MP 101, and coordinate the payment of the mobility usage cost for utilizing the first vehicle 103 of the first MP 101 to execute the transportation request of the requesting MP 101. Accordingly, the requesting MP 101 can flexibly utilize the first vehicle 103 of the first MP 101 to execute the transportation request for the user of the requesting MP 101 even if the requesting MP 101 does not have sufficient transportation capacity to itself execute the transportation request. Furthermore, the transportation request of the requesting MP 101 can be executed in conformity with the operational protocol of the requesting MP 101 even though the transportation request is executed by the first vehicle 103 of the first MP 101. The implementation of the mobility agent 120 is also advantageous, because it can eliminate the need to disclose the vehicle movement requirements and the vehicle feature requirements of the requesting MP 101 to the first MP 101, and the need to disclose the vehicle status data associated with the vehicles 103 of first MP 101 to the requesting MP 101. In addition, the requesting MP 101 and the first MP 101 may not need to establish direct communication channel or vehicle utilization agreement with one another.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
    receiving, by one or more processors, from a first server of a first mobility provider (MP) via an electronic communication network, one or more request parameters of a transportation request and one or more vehicle movement requirements of the first MP, the first MP having associated a first set of vehicles with a first set of vehicle profiles;
    determining, by the one or more processors, to use additional capacity than the first set of vehicles based on the one or more request parameters of the first server and the first set of vehicle profiles;
    selecting, by the one or more processors, from a second set of vehicle profiles of one or more alternate MPs, one or more vehicle profiles of the one or more alternate MPs based on the one or more request parameters of the transportation request and the additional capacity, the one or more alternate MPs having associated a second set of vehicles with the second set of vehicle profiles, the one or more vehicle profiles including a certain vehicle profile representing a certain vehicle of a second MP, the one or more alternate MPs including the second MP, the second MP being different than the first MP;
    receiving, by the one or more processors, from a second server of the second MP, a mobility plan for the certain vehicle to execute the transportation request, the mobility plan of the certain vehicle being generated based on the one or more request parameters of the transportation request and an operational protocol of the second MP;
    determining, by the one or more processors, that the certain vehicle is qualified to execute the transportation request using the one or more vehicle movement requirements of the first MP and the mobility plan of the certain vehicle; and
    responsive to determining that the certain vehicle is qualified to execute the transportation request, transmitting, by the one or more processors, the mobility plan of the certain vehicle to the first server of the first MP via the electronic communication network.

2. The method of claim 1, wherein determining that the certain vehicle is qualified to execute the transportation request includes:
    computing, using a metric estimation model, one or more estimated vehicle movement metrics of the certain vehicle traveling according to the mobility plan; and
    determining that the one or more estimated vehicle movement metrics of the certain vehicle satisfy the one or more vehicle movement requirements of the first MP.

3. The method of claim 2, wherein
    the mobility plan of the certain vehicle includes a travel route of the certain vehicle from a pick-up point to a destination point of the transportation request, the travel route of the certain vehicle including one or more road segments; and
    computing the one or more estimated vehicle movement metrics of the certain vehicle traveling according to the mobility plan includes computing, using the metric estimation model, the one or more estimated vehicle movement metrics of the certain vehicle using a vehicle operation model of the certain vehicle, roadway data of the one or more road segments in the travel route, and a traffic model of the one or more road segments in the travel route.

4. The method of claim 2, further comprising:
receiving, from the first server of the first MP, a plan selection selecting the mobility plan of the certain vehicle to execute the transportation request;
monitoring one or more vehicle movement metrics of the certain vehicle during an execution of the transportation request by the certain vehicle according to the mobility plan;
computing a feedback value based on a vehicle movement metric of the certain vehicle and an estimated vehicle movement metric of the certain vehicle; and
adjusting one or more model parameters of the metric estimation model based on the feedback value.

5. The method of claim 1, wherein determining that the certain vehicle is qualified to execute the transportation request includes:
determining, using a vehicle selection model, that the certain vehicle is qualified to execute the transportation request using vehicle category data of the certain vehicle, a vehicle operation model of the certain vehicle, the mobility plan of the certain vehicle, and the one or more vehicle movement requirements of the first MP.

6. The method of claim 5, further comprising:
receiving, from the first server of the first MP, a plan selection selecting the mobility plan of the certain vehicle to execute the transportation request;
monitoring one or more vehicle movement metrics of the certain vehicle during an execution of the transportation request by the certain vehicle according to the mobility plan;
computing a feedback value based on a vehicle movement metric of the certain vehicle and a vehicle movement requirement of the first MP; and
adjusting one or more model parameters of the vehicle selection model based on the feedback value.

7. The method of claim 1, wherein
the one or more request parameters of the transportation request include one or more of a number of vehicle users, a luggage space, a pick-up point, a destination point, and a pick-up time of the transportation request;
the one or more vehicle movement requirements of the first MP specify one or more of a waiting time, a traveling time, a vehicle speed, an acceleration/deceleration rate, a vehicle vibration metric, and an interior noise level;
the mobility plan of the certain vehicle includes one or more of a travel route of the certain vehicle from the pick-up point to the destination point of the transportation request, an estimated pick-up time, an estimated arrival time, and a mobility usage cost; and
the travel route of the certain vehicle from the pick-up point to the destination point of the transportation request is determined based on a vehicle route plan of the certain vehicle and a route calculation model implemented by the second MP.

8. The method of claim 1, wherein selecting the one or more vehicle profiles of the one or more alternate MPs includes:
selecting the one or more vehicle profiles representing one or more vehicles that have an available user space and an available luggage space satisfying a number of vehicle users and a luggage space of the transportation request.

9. The method of claim 8, wherein selecting the one or more vehicle profiles of the one or more alternative MPs includes:
selecting the one or more vehicle profiles representing the one or more vehicles that have a distance between a vehicle location of the one or more vehicles and a pick-up point of the transportation request satisfying a distance threshold.

10. The method of claim 1, further comprising:
receiving, from the first server of the first MP, one or more vehicle feature requirements of the first MP; and wherein
selecting the one or more vehicle profiles of the one or more alternate MPs includes selecting the one or more vehicle profiles representing one or more vehicles that satisfy the one or more vehicle feature requirements of the first MP.

11. The method of claim 10, wherein the one or more vehicle feature requirements of the first MP specify one or more of a driving assistance feature, an infotainment feature, a seat type, a legroom size, an interior temperature, an interior humidity level, and a food and beverage option.

12. The method of claim 1, further comprising:
receiving, from the first server of the first MP, a plan selection selecting the mobility plan of the certain vehicle to execute the transportation request;
monitoring one or more vehicle movement metrics of the certain vehicle during an execution of the transportation request by the certain vehicle according to the mobility plan;
determining that a vehicle movement metric of the certain vehicle violates a vehicle movement requirement of the first MP; and
responsive to determining that the vehicle movement metric of the certain vehicle violates the vehicle movement requirement of the first MP, notifying a violation of the vehicle movement requirement to the first server of the first MP.

13. The method of claim 12, further comprising:
computing a violation amount based on the vehicle movement metric of the certain vehicle and the vehicle movement requirement of the first MP; and
adjusting a travel cost associated with the transportation request based on the violation amount.

14. The method of claim 12, further comprising:
computing a violation amount based on the vehicle movement metric of the certain vehicle and the vehicle movement requirement of the first MP;
determining that the violation amount satisfies a violation amount threshold; and
responsive to determining that the violation amount satisfies the violation amount threshold, providing a maintenance operation to the certain vehicle.

15. A system comprising:
one or more processors; and
one or more memories storing instructions that, when executed by the one or more processors, cause the system to:
receive, from a first server of a first mobility provider (MP) via an electronic communication network, one or more request parameters of a transportation request and one or more vehicle movement requirements of the first MP, the first MP having associated a first set of vehicles with a first set of vehicle profiles;

determine to use additional capacity than the first set of vehicles based on the one or more request parameters of the first server and the first set of vehicle profiles;

select, from a second set of of vehicle profiles of one or more alternate MPs, one or more vehicle profiles of the one or more alternate MPs based on the one or more request parameters of the transportation request and the additional capacity, the one or more alternate MPs having associated a second set of vehicles with the second set of vehicle profiles, the one or more vehicle profiles including a certain vehicle profile representing a certain vehicle of a second MP, the one or more alternate MPs including the second MP, the second MP being different than the first MP;

receive, from a second server of the second MP, a mobility plan for the certain vehicle to execute the transportation request, the mobility plan of the certain vehicle being generated based on the one or more request parameters of the transportation request and an operational protocol of the second MP;

determine that the certain vehicle is qualified to execute the transportation request using the one or more vehicle movement requirements of the first MP and the mobility plan of the certain vehicle; and responsive to determining that the certain vehicle is qualified to execute the transportation request, transmit the mobility plan of the certain vehicle to the first server of the first MP via the electronic communication network.

16. The system of claim 15, wherein to determine that the certain vehicle is qualified to execute the transportation request includes:

computing, using a metric estimation model, one or more estimated vehicle movement metrics of the certain vehicle traveling according to the mobility plan; and determining that the one or more estimated vehicle movement metrics of the certain vehicle satisfy the one or more vehicle movement requirements of the first MP.

17. The system of claim 16, wherein the mobility plan of the certain vehicle includes a travel route of the certain vehicle from a pick-up point to a destination point of the transportation request, the travel route of the certain vehicle including one or more road segments; and to compute the one or more estimated vehicle movement metrics of the certain vehicle traveling according to the mobility plan includes computing, using the metric estimation model, the one or more estimated vehicle movement metrics of the certain vehicle using a vehicle operation model of the certain vehicle, roadway data of the one or more road segments in the travel route, and a traffic model of the one or more road segments in the travel route.

18. The system of claim 16, wherein the instructions, when executed by the one or more processors, further cause the system to:

receive, from the first server of the first MP, a plan selection selecting the mobility plan of the certain vehicle to execute the transportation request;

monitor one or more vehicle movement metrics of the certain vehicle during an execution of the transportation request by the certain vehicle according to the mobility plan;

compute a feedback value based on a vehicle movement metric of the certain vehicle and an estimated vehicle movement metric of the certain vehicle; and adjust one or more model parameters of the metric estimation model based on the feedback value.

19. The system of claim 15, wherein to determine that the certain vehicle is qualified to execute the transportation request includes:

determining, using a vehicle selection model, that the certain vehicle is qualified to execute the transportation request using vehicle category data of the certain vehicle, a vehicle operation model of the certain vehicle, the mobility plan of the certain vehicle, and the one or more vehicle movement requirements of the first MP.

20. The system of claim 19, wherein the instructions, when executed by the one or more processors, further cause the system to:

receive, from the first server of the first MP, a plan selection selecting the mobility plan of the certain vehicle to execute the transportation request;

monitor one or more vehicle movement metrics of the certain vehicle during an execution of the transportation request by the certain vehicle according to the mobility plan;

compute a feedback value based on a vehicle movement metric of the certain vehicle and a vehicle movement requirement of the first MP; and adjust one or more model parameters of the vehicle selection model based on the feedback value.

21. The system of claim 15, wherein the one or more request parameters of the transportation request include one or more of a number of vehicle users, a luggage space, a pick-up point, a destination point, and a pick-up time of the transportation request;

the one or more vehicle movement requirements of the first MP specify one or more of a waiting time, a traveling time, a vehicle speed, an acceleration/deceleration rate, a vehicle vibration metric, and an interior noise level;

the mobility plan of the certain vehicle includes one or more of a travel route of the certain vehicle from the pick-up point to the destination point of the transportation request, an estimated pick-up time, an estimated arrival time, and a mobility usage cost; and the travel route of the certain vehicle from the pick-up point to the destination point of the transportation request is determined based on a vehicle route plan of the certain vehicle and a route calculation model implemented by the second MP.

22. The system of claim 15, wherein to select the one or more vehicle profiles of the one or more alternate MPs includes:

selecting the one or more vehicle profiles representing one or more vehicles that have an available user space and an available luggage space satisfying a number of vehicle users and a luggage space of the transportation request.

23. The system of claim 22, wherein to select the one or more vehicle profiles of the one or more alternate MPs includes:

selecting the one or more vehicle profiles representing the one or more vehicles that have a distance between a vehicle location of the one or more vehicles and a pick-up point of the transportation request satisfying a distance threshold.

24. The system of claim 15, wherein the instructions, when executed by the one or more processors, further cause the system to:
receive, from the first server of the first MP, one or more vehicle feature requirements of the first MP; and wherein
select the one or more vehicle profiles of the one or more alternate MPs includes selecting the one or more vehicle profiles representing one or more vehicles that satisfy the one or more vehicle feature requirements of the first MP.

25. The system of claim 24, wherein the one or more vehicle feature requirements of the first MP specify one or more of a driving assistance feature, an infotainment feature, a seat type, a legroom size, an interior temperature, an interior humidity level, and a food and beverage option.

26. The system of claim 15, wherein the instructions, when executed by the one or more processors, further cause the system to:
receive, from the first server of the first MP, a plan selection selecting the mobility plan of the certain vehicle to execute the transportation request;
monitor one or more vehicle movement metrics of the certain vehicle during an execution of the transportation request by the certain vehicle according to the mobility plan;
determine that a vehicle movement metric of the certain vehicle violates a vehicle movement requirement of the first MP; and
responsive to determining that the vehicle movement metric of the certain vehicle violates the vehicle movement requirement of the first MP, notify a violation of the vehicle movement requirement to the first server of the first MP.

27. The system of claim 26, wherein the instructions, when executed by the one or more processors, further cause the system to:
compute a violation amount based on the vehicle movement metric of the certain vehicle and the vehicle movement requirement of the first MP; and
adjust a travel cost associated with the transportation request based on the violation amount.

28. The system of claim 26, wherein the instructions, when executed by the one or more processors, further cause the system to:
compute a violation amount based on the vehicle movement metric of the certain vehicle and the vehicle movement requirement of the first MP;
determine that the violation amount satisfies a violation amount threshold; and
responsive to determining that the violation amount satisfies the violation amount threshold, provide a maintenance operation to the certain vehicle.

29. A method comprising:
receiving, by one or more processors, from a first server of a first mobility provider (MP) via an electronic communication network, one or more request parameters of a transportation request and one or more vehicle movement requirements of the first MP, the first MP having associated a first set of vehicles with a first set of vehicle profiles;
determining, by the one or more processors, to use additional capacity than the first set of vehicles based on the one or more request parameters of the first server and the first set of vehicle profiles;
selecting, by the one or more processors, from a second set of vehicle profiles of one or more alternate MPs, one or more vehicle profiles of one or more alternate MPs based on the one or more request parameters of the transportation request and the additional capacity, the one or more alternate MPs having associated a second set of vehicles with the second set of vehicle profiles, the one or more vehicle profiles including a certain vehicle profile representing a certain vehicle of a second MP, the one or more alternate MPs including the second MP, the second MP being different than the first MP;
receiving, by the one or more processors, from a second server of the second MP, a mobility plan for the certain vehicle to execute the transportation request, the mobility plan of the certain vehicle being generated based on the one or more request parameters of the transportation request and an operational protocol of the second MP;
determining, by the one or more processors, using a vehicle selection model, that the certain vehicle is qualified to execute the transportation request using the one or more vehicle movement requirements of the first MP and the mobility plan of the certain vehicle; and
responsive to determining that the certain vehicle is qualified to execute the transportation request, providing, by the one or more processors, the mobility plan of the certain vehicle to the first server of the first MP via the electronic communication network.

30. The method of claim 29, wherein determining that the certain vehicle is qualified to execute the transportation request includes:
determining, using the vehicle selection model, that the certain vehicle is qualified to execute the transportation request using vehicle category data of the certain vehicle, a vehicle operation model of the certain vehicle, the mobility plan of the certain vehicle, and the one or more vehicle movement requirements of the first MP.

* * * * *